US012403691B2

(12) United States Patent
Byun et al.

(10) Patent No.: US 12,403,691 B2
(45) Date of Patent: Sep. 2, 2025

(54) INKJET PRINTHEAD AND METHOD OF MANUFACTURING THE SAME

(71) Applicant: ENJET CO. LTD., Suwon-si (KR)

(72) Inventors: Do Young Byun, Seoul (KR); Vu Dat Nguyen, Suwon-si (KR); Chihyun Park, Seoul (KR); Byungjik Lim, Suwon-si (KR); Hyungdong Lee, Hwaseong-si (KR); Hyunwoong Yoo, Suwon-si (KR); Jaewoo Joung, Seongnam-si (KR)

(73) Assignee: ENJET CO. LTD., Suwon-si (KR)

( * ) Notice: Subject to any disclaimer, the term of this patent is extended or adjusted under 35 U.S.C. 154(b) by 125 days.

(21) Appl. No.: 18/180,541

(22) Filed: Mar. 8, 2023

(65) Prior Publication Data

US 2023/0286272 A1 Sep. 14, 2023

Related U.S. Application Data

(63) Continuation-in-part of application No. 17/656,401, filed on Mar. 24, 2022, now abandoned.

(30) Foreign Application Priority Data

Mar. 10, 2022 (KR) ........................ 10-2022-0029786
Dec. 7, 2022 (KR) ........................ 10-2022-0169557

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/1623* (2013.01); *B41J 2002/14419* (2013.01)

(58) Field of Classification Search
CPC .... B41J 2/14201; B41J 2/1607; B41J 2/1623; B41J 2002/14419; B41J 2/06;
(Continued)

(56) References Cited

U.S. PATENT DOCUMENTS

2006/0268059 A1 11/2006 Wu et al.
2008/0074476 A1* 3/2008 Yoo ............................ B41J 2/06 347/71
2011/0183478 A1* 7/2011 Chung ....................... B41J 2/06 257/E21.414

FOREIGN PATENT DOCUMENTS

EP 2 567 819 A2 3/2013

OTHER PUBLICATIONS

European Search Report dated Aug. 29, 2022 in European Application No. EP 22 16 4164.

(Continued)

*Primary Examiner* — Lisa Solomon
(74) *Attorney, Agent, or Firm* — Saliwanchik, Lloyd & Eisenschenk

(57) ABSTRACT

Disclosed are an inkjet printhead and a method of manufacturing the same, the inkjet printhead including: a first layer including an inlet formed to penetrate a substrate and introduce ink therein, and a plurality of membranes; a second layer disposed beneath the first layer, and including a manifold formed to penetrate a substrate and communicate with the inlet or recessed on a top of the substrate, and a plurality of nozzle channels formed to penetrate the substrate below the membrane and allow the ink transferred from the manifold to flow therein; a third layer disposed beneath the second layer, and including a plurality of nozzles formed in a substrate and communicating the plurality of nozzle channels; a piezoelectric actuator formed on the first layer formed with the membrane, and including a lower first electrode, a piezoelectric body on the first electrode, and a
(Continued)

second electrode on the piezoelectric body; a first voltage controller configured to oscillate the membrane by applying a pulse voltage to the first electrode and the second electrode; a third electrode disposed beneath the third layer, formed around each nozzle, and surrounded with an insulator; and a second voltage controller configured to discharge droplets of the ink based on induced electric force by applying voltage to the third electrode.

20 Claims, 16 Drawing Sheets

(58) Field of Classification Search
CPC ........ B41J 2/1606; B41J 2/161; B41J 2/1626; B41J 2/1631; B41J 2/1646; B41J 2/14233
See application file for complete search history.

(56) References Cited

OTHER PUBLICATIONS

Office Action dated Sep. 12, 2024 in Korean Application No. 10-2022-0169557.

* cited by examiner (a)

(b)

INKJET PRINTHEAD AND METHOD OF MANUFACTURING THE SAME

CROSS-REFERENCE TO RELATED APPLICATIONS

This application is a continuation-in-part of U.S. application Ser. No. 17/656,401, filed Mar. 24, 2022; which claims priority from Korean Patent Application No. 10-2022-0029786, filed Mar. 10, 2022; this application also claims priority from Korean Patent Application No. 10-2022-0169557, filed Dec. 7, 2022, the disclosures of which are incorporated herein by reference.

BACKGROUND OF THE INVENTION

(a) Field of the Invention

The disclosure relates to an inkjet printhead and a method of manufacturing the same, and more particularly to an inkjet printhead and a method of manufacturing the same, in which a multi-nozzle is used to discharge ink in a hybrid way based on combination of a piezoelectric method and an induced electrohydrodynamic method that discharges a charged solution by electrostatic force induced on a liquid surface at the end of the nozzle.

(b) Description of the Related Art

In general, an inkjet printhead refers to a device that prints an image with predetermined colors on a surface of a printing medium by discharging fine droplets of ink to a desired position on the printing medium. The applications of the inkjet printhead have recently expanded to various fields such as a liquid crystal display (LCD), an organic light emitting device (OLED) and the like flat panel display fields; electronic (E)-paper and the like flexible display fields; metal wiring and the like printed electronics field; bio fields; and so on.

Drop-on-demand (DOD) inkjet printhead is classified according to discharging methods into a piezoelectric inkjet printhead that discharges ink by pressure waves based on transformation of a piezoelectric body, and an electrohydrodynamic inkjet printhead that discharges ink by electrostatic force.

In the piezoelectric inkjet printhead, a piezoelectric body vibrates a membrane to apply pressure to a chamber containing ink, thereby discharging the ink. In general, droplets are discharged when pressure high enough to overcome the surface tension and viscosity of the ink on the surface of a nozzle is applied, and pressure applied additionally is required to be high enough to accelerate the discharged droplets to a speed at which these droplets can be accurately settled on a printing medium. To discharge a droplet of several picoliters or less, the piezoelectric inkjet printhead needs to reduce transformation energy in a pressure chamber. When the transformation energy in the pressure chamber is reduced, discharging energy per unit volume of the discharged droplets is also reduced, and therefore a discharging speed of the droplets is decreased. However, when the discharging speed of the droplets is decreased, a problem arises in that the droplets are not accurately discharged to desired positions.

The piezoelectric inkjet printhead is advantageous in that it is easy to control a printing job, and there are no restrictions on the types of ink because the discharging energy is based on mechanical transformation. However, the piezoelectric inkjet printhead has difficulty in discharging ultrafine droplets of several picoliters or less, and has a limitation in that the discharge of only ink having a viscosity of about 10 cPs is possible but the discharge of ink having a high viscosity is not possible. Further, it is difficult to discharge big droplets of 80 picoliters or more due to the limitations on the discharging energy. In particular, the piezoelectric inkjet printhead has a limitation even though volume uniformity of discharged droplets between a plurality of nozzles is very important for applications to the processes of the printed electronics such as a display, etc. unlike the existing graphic printing.

On the other hand, the electrohydrodynamic inkjet printhead provides the discharging energy by applying electrostatic force to a liquid surface of ink formed at the end of a nozzle, and is therefore advantageous in that the discharge of ultrafine droplets of not more than several picoliters or femtoliters is possible and the discharge of ink droplets having a high viscosity of about 1,000 cPs is possible. Besides, it is also possible to discharge big droplets of 80 picoliters or more. The electrohydrodynamic inkjet printhead is advantageous for precise printing because a driving method is simple and the directionality of discharged ink droplets is excellent due to control based on distribution of an electric field formed on the nozzle. However, the electrohydrodynamic inkjet printhead has difficulty in cleaning the nozzle, which needs to be performed during a process, because the nozzle has a protruding structure for the concentration of the electric field. An inkjet head generally secures the stability of droplet jetting by cleaning the nozzle, which is contaminated with the ink, through wiping or the like process. However, it is not easy to apply such a cleaning process to the protruding nozzle. When the droplets are discharged by an electrohydrodynamic inkjet method, a voltage of several hundred V to several KV is applied. Further, a voltage controller having a very high slew rate is required to discharge the droplets by a DOD method. Therefore, there is a limit to discharging the droplets at a high frequency to secure sufficient discharging energy. It is known that the electrohydrodynamic inkjet method has the maximum jetting frequency of about 1 kHz. However, this jetting frequency is very low as compared to the high jetting frequency of 100 kHz the foregoing piezoelectric inkjet method has.

Accordingly, there has been proposed a method of combining the foregoing two methods to minimize the shortcomings and utilize the advantages.

In terms of combining the two methods, an electrohydrodynamic high-voltage electrode is disposed inside a nozzle, an ink chamber or an ink inlet. However, contact between the ink and the electrode causes an electro-chemical reaction that generates heat, and therefore problems arise in that the ink is denaturalized, bubbles are generated, the nozzle is clogged, etc. Further, there have been many technical difficulties such as difficulties in processing a membrane structure of the piezoelectric body, an electrode for electrohydrodynamic inkjet driving, etc.

In addition, there has been a problem in that printing quality is poor because the droplets discharged through the multi-nozzle are not uniform in size.

DOCUMENT OF RELATED ART

Patent Document (Patent document 1) Korean Patent No. 10-0917279

SUMMARY OF THE INVENTION

Accordingly, the disclosure is conceived to solve the foregoing problems, and an aspect of the disclosure is to provide an inkjet printhead and a method of manufacturing the same, in which, as an inkjet apparatus having a layered multi-nozzle, a pressure wave based on oscillation of a piezoelectric body controls a liquid surface at the end of the nozzle, and a droplet is discharged by applying electrostatic force based on an induced electric field to the liquid surface, thereby overcoming viscosity and surface tension to discharge ultrafine droplets or large droplets based on combination between mechanical driving force of the piezoelectric body and the electrostatic force, and improving size uniformity of droplets between the nozzles based control of the electrostatic force for each nozzle.

The problems to be solved by the disclosure are not limited to those mentioned above, and other unmentioned problems will become apparent to a person skilled in the art by the following descriptions.

In accordance with an embodiment of the disclosure, there is provided an inkjet printhead including: a first layer including an inlet formed to penetrate a substrate and introduce ink therein, and a plurality of membranes; a second layer disposed beneath the first layer, and including a manifold formed to penetrate a substrate and communicate with the inlet or recessed on a top of the substrate, and a plurality of nozzle channels formed to penetrate the substrate below the membrane and allow the ink transferred from the manifold to flow therein; a third layer disposed beneath the second layer, and including a plurality of nozzles formed in a substrate and communicating the plurality of nozzle channels; a piezoelectric actuator formed on the first layer formed with the membrane, and including a lower first electrode, a piezoelectric body on the first electrode, and a second electrode on the piezoelectric body; a first voltage controller configured to oscillate the membrane by applying a pulse voltage to the first electrode and the second electrode; a third electrode disposed beneath the third layer, formed around each nozzle, and surrounded with an insulator; and a second voltage controller configured to discharge droplets of the ink based on induced electric force by applying voltage to the third electrode.

Here, the first layer may include a plurality of chambers recessed inward from a bottom thereof to store the ink and formed with the membrane above a top thereof.

Here, the chamber may include a first side communicating with the manifold, and a second side communicating with the nozzle channel.

Here, the inkjet printhead may further include a hydrophobic coating layer disposed beneath an insulating layer formed the insulator and coated with a hydrophobic material.

Here, the hydrophobic coating layer may be coated from an end of the nozzle to an inside of the nozzle.

Here, voltage applied by the first voltage controller may be synchronized with voltage applied by the second voltage controller.

Here, the second voltage controller may apply voltage to the third electrode to discharge a droplet when a meniscus is formed at an end of the nozzle as the first voltage controller applies a pulse voltage between the first electrode and the second to make the piezoelectric actuator oscillate the membrane, and the second voltage controller may apply a voltage having an opposite polarity to a discharging voltage or applies a voltage of 0V after the discharged droplet passes the third electrode.

Here, the inkjet printhead may further include a fourth electrode disposed beneath the third electrode, surrounded with an insulating layer, and disposed encompassing an outlet having a larger diameter than an opening of the nozzle; and a third voltage controller configured to apply voltage to the fourth electrode.

Here, voltage applied by the second voltage controller may be synchronized with voltage applied by the third voltage controller.

Here, a horizontal distance between the fourth electrode and the nozzle may be longer than a horizontal distance between the third electrode and the nozzle.

Here, the plurality of nozzles may be arranged in a matrix, and the third electrodes arranged in one of a row direction and a column direction may be electrically connected to simultaneously receive voltage from the second voltage controller, and the fourth electrodes arranged in the other one of the row direction and the column direction may be electrically connected to simultaneously receive voltage from the third voltage controller.

Here, the inkjet printhead may further include a fifth electrode disposed between the first layer and the second layer and surrounded with an insulating layer; and a fourth voltage controller configured to apply voltage to the fifth electrode.

Here, the first voltage controller may apply the same pulse voltage to the piezoelectric actuators respectively corresponding to the membranes, and the second voltage controller may apply different voltages to the third electrodes according to the nozzles to make droplets discharged from the nozzles be uniform in size.

Here, the fourth voltage controller may apply voltage, which has an opposite polarity to the voltage of the second voltage controller, to the fifth electrode, or may serve as the ground.

Here, the pulse voltage applied by the first voltage controller may be synchronized with the pulse voltage applied by the fourth voltage controller, so that electrostatic force based on potential difference between the first electrode and the fifth electrode can reinforce the oscillation of the membrane.

Here, the third electrodes may be formed as a single body for a plurality of nozzles.

Further, in accordance with an embodiment of the disclosure, there is provided a method of manufacturing an inkjet printhead, including: manufacturing a first layer including an inlet formed to penetrate a substrate and introduce ink therein, and a plurality of membranes on which a first electrode of a piezoelectric actuator is formed, a second layer including a manifold formed to penetrate a substrate and communicate with the inlet or recessed on a top of the substrate, and a plurality of nozzle channels formed to penetrate the substrate below the membrane and allow the ink transferred from the manifold to flow therein, and a third layer including a plurality of nozzles formed in a substrate and communicating the plurality of nozzle channels, and a third electrode disposed beneath the third layer, formed around each nozzle, and surrounded with an insulator; joining the first layer, the second layer, and the third layer in sequence; and forming a piezoelectric body and a second electrode for a piezoelectric actuator on the first electrode.

Here, the first layer may include a plurality of chambers recessed inward from a bottom thereof to store the ink and formed with the membrane above a top thereof.

Here, the method may further include coating a hydrophobic material on a lower layer of the insulator when the third layer is manufactured.

Here, a hydrophobic coating layer coated with the hydrophobic material may be coated from an end of the nozzle to an inside of the nozzle.

Here, the method may further include forming a fourth electrode, disposed beneath the third electrode, surrounded with an insulator, and having a larger diameter than the third electrode when the third layer is manufactured.

Here, the method may further include forming a fifth electrode disposed on the second layer and surrounded with an insulator when the third layer is manufactured.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Specific features of embodiments are involved in the detailed description and the accompanying drawings.

The merits and features of the disclosure, and methods of achieving them will become apparent with reference to the embodiments described below in detail and the accompanying drawings. However, the disclosure is not limited to the embodiments set forth herein, but may be implemented in various forms. The following embodiments are provided in order to fully describe the disclosure and enable those skilled in the art, to which the disclosure pertains, to understand the disclosure, the scope of which is defined in the appended claims. Like numerals refer to like elements throughout.

Below, embodiments of an inkjet printhead and a method of manufacturing the same according to the disclosure will be described with reference to the accompanying drawings.

Figure 1:
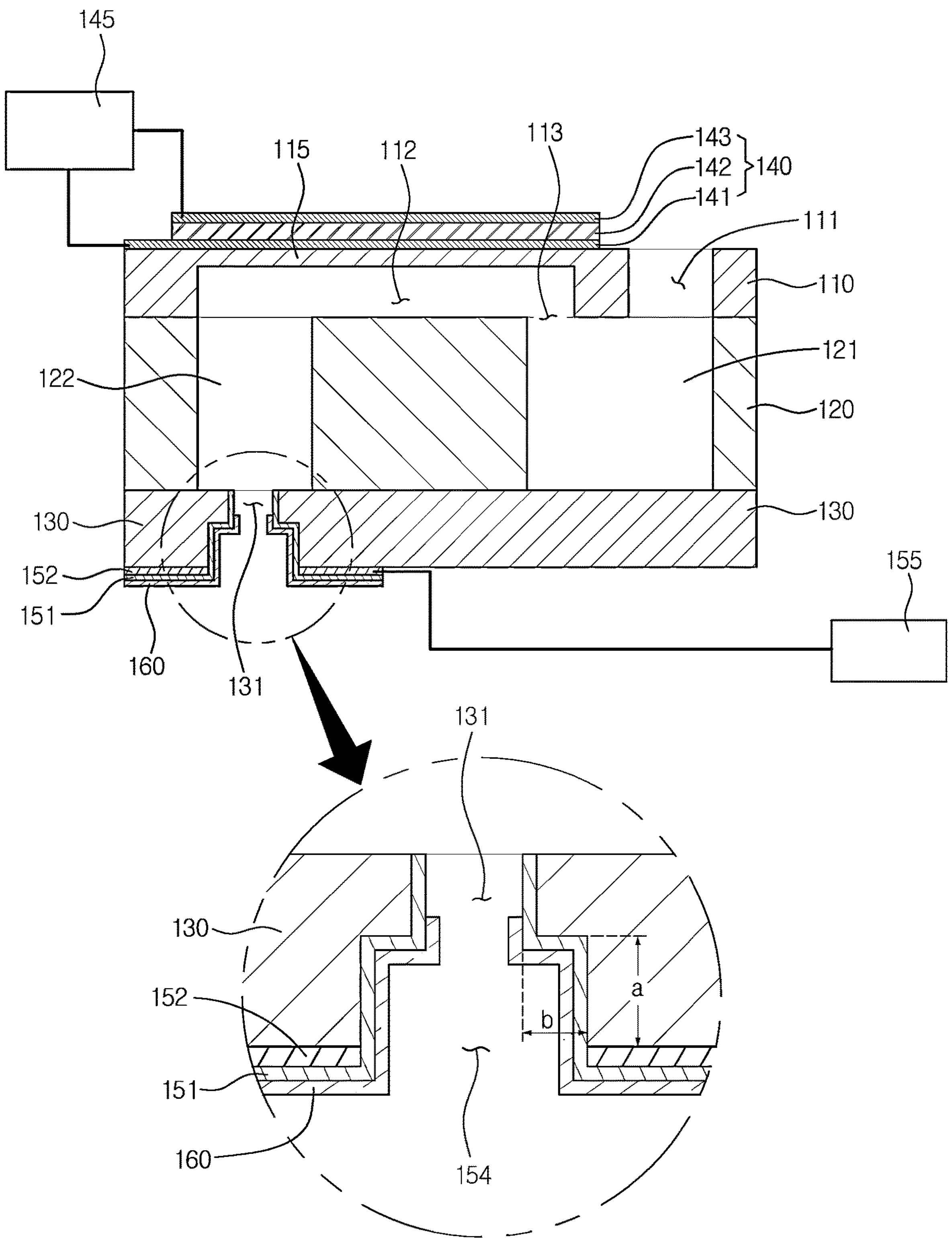
FIG. 1 is a cross-sectional view of an inkjet printhead according to a first embodiment of the disclosure.
Figure 2:
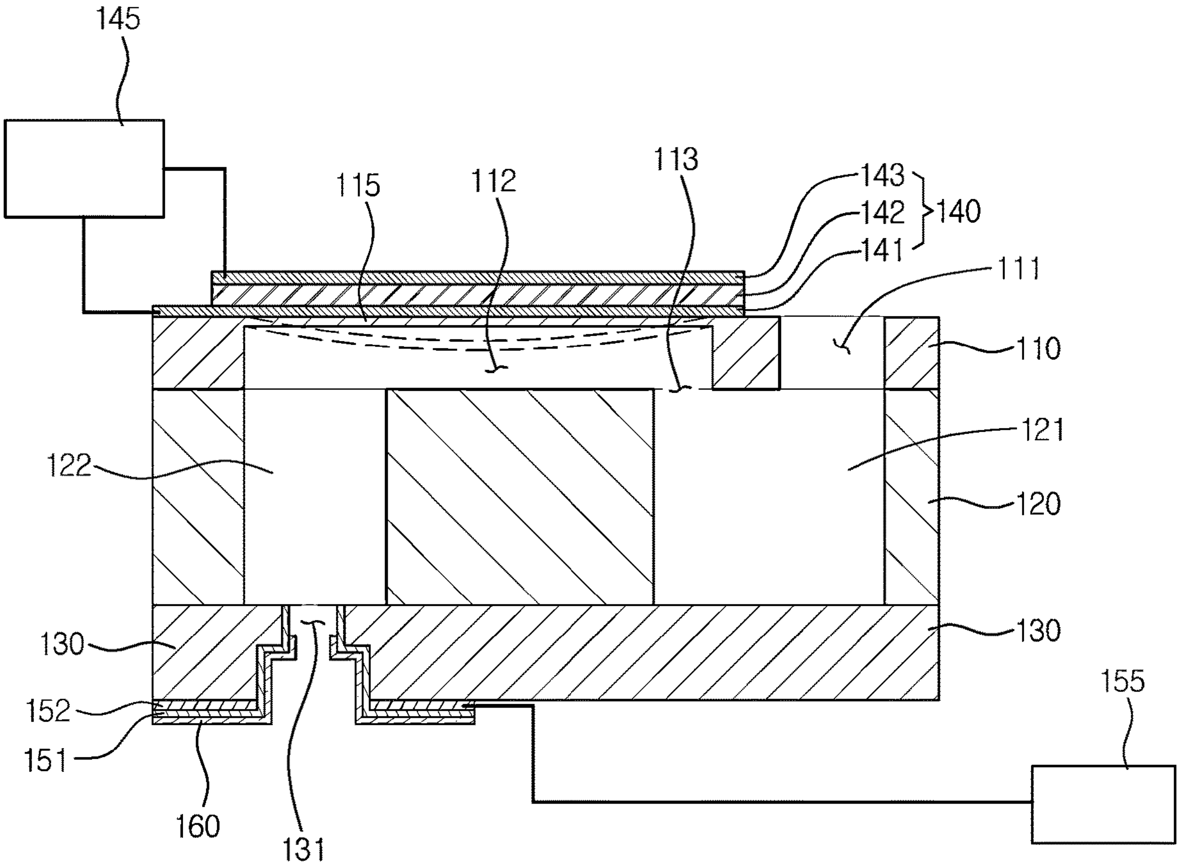
FIG. 2 is a view showing an operation of a membrane based on a piezoelectric body of FIG. 1.

FIG. 1 is a cross-sectional view of an inkjet printhead according to a first embodiment of the disclosure, and FIG. 2 is a view showing an operation of a membrane based on a piezoelectric body of FIG. 1.

An inkjet printhead according to the first embodiment of the disclosure may include a first layer 110, a second layer 120, a third layer 130, a piezoelectric actuator 140, a first voltage controller 145, an electrode (i.e., a third electrode 152) for electrohydrodynamic jetting, and a second voltage controller 155.

The first layer (hereinafter, referred to as a chamber layer) 110 may be formed with an inlet 111 into which ink is introduced from the outside, and a plurality of membranes 115 which oscillates by the piezoelectric actuator 140. The inlet 111 is formed to vertically penetrate a substrate, which forming the chamber layer 110, at a predetermined position, and the substrate is formed with the thin membrane 115 having a predetermined thickness. The inlet 111 refers to an opening through which ink stored in an ink storage tank (not shown) flows into the inside of the printhead.

As shown therein, a chamber 112 may be formed as recessed inward on the bottom of the substrate, and filled with the ink supplied through the inlet 111, and the membrane 115 may be formed above the chamber 112. Although not shown, a plurality of chambers 112 are spaced apart from each other in a direction perpendicular to FIG. 1, and thus the chamber 112 and the membrane 115 are formed corresponding to each of a plurality of nozzles 131.

On the membrane 115 of the chamber layer 110, a first electrode 141, a piezoelectric body 142 on the first electrode 141, and a second electrode 143 on the piezoelectric body 142, which form the piezoelectric actuator 140, may be stacked in sequence. Further, a pulse voltage may be applied between the first electrode 141 and the second electrode 143 through the first voltage controller 145.

The first electrode 141 serves as a common electrode, and the second electrode 143 serves as a driving electrode for applying the pulse voltage to the piezoelectric body 142. Therefore, a plurality of second electrodes 143 may be individually disposed with regard to the plurality of nozzles 131. The piezoelectric body 142 may contain a predetermined piezoelectric material, for example, a piezoelectric transducer (PZT).

In this case, the second electrode 143 on the piezoelectric body 142 is formed as the common electrode, and a plurality of first electrodes 141 beneath the piezoelectric body 142 are disposed corresponding to the plurality of nozzles 131, thereby applying the pulse voltage.

When the first voltage controller 145 applies the pulse voltage between the two electrodes 141 and 143 forming the piezoelectric actuator 140, the membrane 115 may be transformed up and down by the operation of the piezoelectric body 142. In this case, the membrane 115 serves as a vibrating plate that generates pressure waves in the chamber 112 based on the transformation of the membrane 115.

The voltage applied by the first voltage controller 145 may be a pulse voltage in which a positive voltage or a negative voltage is periodically generated having a predetermined amplitude. Further, the voltage applied by the first voltage controller 145 may be a pulse voltage in which a positive voltage and a negative voltage are periodically generated having a predetermined amplitude. In addition, the voltage applied by the first voltage controller 145 may be an alternative current (AC) voltage having a predetermined waveform such as a sine wave, a triangular wave, and so on.

The second layer (hereinafter, referred to as a channel layer) 120 is disposed beneath the chamber layer 110, and may include a manifold 121 formed penetrating a substrate having a predetermined thickness and communicating with the inlet 111, and a plurality of nozzle channels 122 formed penetrating the substrate and allowing the ink to flow from a first side of the manifold 121. As shown therein, a restrictor 113 is formed below a first side of the chamber 112 to communicate with the manifold 121 and communicates with the nozzle channel 122 below a second side of the chamber 112.

Therefore, the ink flowing from the outside into the chamber layer 110 through the inlet 111 is stored in the space of the manifold 121 formed together with the top of the nozzle layer 130, and the ink stored in the manifold 121 is transferred to each chamber 112 via the restrictor 113 and then transferred to the nozzle channel 122. The nozzle channel 122 is disposed between the chamber 112 of the chamber layer 110 and the nozzle 131 of the nozzle layer 130.

The restrictor 113 serves to restrict the pressure waves traveling toward the nozzle and traveling toward the manifold 121 due to the transformation of the piezoelectric body 142. To this end, the cross-sectional area of the restrictor 113 may be equal to or smaller than the cross-sectional area of the nozzle channel 122.

In the accompanying drawings, the manifold 121 penetrates the substrate and forms a space, in which the ink is stored, together with the top of the third layer 130. Alternatively, the manifold may be recessed on the top of the substrate at a predetermined depth without penetrating the substrate.

The third layer (hereinafter, referred to as the nozzle layer 130) is disposed beneath the channel layer 120, and includes the plurality of nozzles 131 formed on a substrate having a predetermined thickness and communicating with the nozzle channel 122. Through the nozzle 131, the ink may be discharged forming a droplet toward a printing medium (not shown) put under the nozzle 131.

As shown therein, the nozzle 131 is formed penetrating the nozzle layer 130. In the nozzle layer 130, the nozzle 131 having a relatively small diameter may be formed in an upper portion, and an outlet 154 having a relatively large diameter may be formed in a lower portion. Therefore, openings are formed with stepped increase in diameter downward while penetrating the nozzle layer 130. With this structure, a meniscus may be formed at not the end of the outlet 154 but the end of the nozzle 131 due to the operation of the piezoelectric actuator 140.

On the bottom of the nozzle layer 130, a plurality of third electrodes 152 may be formed being surrounded with an insulating layer 151. The third electrode 152 may be formed in every nozzle 131. In this case, the third electrode 152 may have various shapes such as a circular shape, a horseshoe shape, a quadrangular shape, a diamond shape, etc. Preferably, the third electrode 152 may be shaped to surround all or some of the nozzles 131.

Further, the third electrodes 152 formed in the nozzles 131 may be formed not separately but integrally. In other words, the third electrodes 152 are formed for the nozzles 131, and a connecting structure is formed for connection between adjacent third electrodes 152, thereby forming the third electrodes 152 as a single body. Alternatively, the third electrodes 152 may be individually formed being respectively separated from the nozzles 131.

The third electrode 152 surrounded with the insulating layer 151 may be disposed beneath the bottom of the nozzle layer 130 in such a way that a first insulating layer is formed beneath the bottom of the nozzle layer 130, the third electrode 152 is formed beneath the first insulating layer, and a second insulating layer is formed beneath the third electrode 152. As shown therein, when the nozzle layer 130 is manufactured with a glass wafer, the third electrode 152 may be disposed directly under the nozzle layer 130 because the glass wafer is an insulating material, and the insulating layer 151 may be formed beneath the third electrode 152.

In this case, the insulating layer may be formed not only beneath the bottom of the nozzle layer 130 but also on the inner surfaces of the outlet 154 and the nozzle 131.

The third electrode 152 may be connected to the second voltage controller 155 and receive high voltage.

In addition, a hydrophobic coating layer 160 coated with a hydrophobic material may be formed beneath the insulating layer 151. The hydrophobic coating layer 160 may inhibit the bottom of the printhead, which is likely to come into contact with liquid, from contamination. In this case, the hydrophobic coating layer 160 may also be formed on the inner surface of the outlet 154.

Further, as shown therein, the hydrophobic coating layer 160 may be coated up to a predetermined depth of the nozzle 131 inward from the end. When the hydrophobic coating layer 160 is formed inward from the end of the nozzle 131, a droplet can be formed inside the nozzle 131, thereby increasing the printing stability and showing improvement in terms of maintenance.

In this case, the chamber layer 110, the channel layer 120, and the nozzle layer 130 may be made of silicon wafers. Alternatively, the channel layer 120 and the nozzle layer 130 may also be made of glass wafers.

As shown in FIG. 2, when the first voltage controller 145 applies the pulse voltage between the first electrode 141 and the second electrode 143 of the piezoelectric actuator 140, the piezoelectric body 142 operates to oscillate the membrane 115 up and down. The oscillation of the membrane 115 transfers a pressure wave to the nozzle channel 122, so that a concave or convex meniscus can be formed at the end of the nozzle 131 by negative pressure or positive pressure of the pressure wave.

When the second voltage controller 155 applies high voltage to the third electrode 152 under the condition that the piezoelectric actuator 140 forms the convex meniscus at the end of the nozzle 131 with the positive pressure of the pressure wave, a droplet may be discharged from the meniscus by electrostatic force generated by induced charges. When the membrane 115 is moved up by the piezoelectric actuator 140 and the chamber 112 is increased in volume, the change in pressure causes the ink stored in the manifold 121 to flow into the chamber 112 through the restrictor 113.

Voltage applied to the third electrode 152 may be a positive or negative voltage having a predetermined amplitude. Alternatively, the voltage may be applied in the form of pulses, and thus synchronized with the pressure waves of the piezoelectric body 142. Alternatively, an AC voltage alternating between a positive voltage and a negative voltage may be applied, so that electric charges for discharging a droplet can be stabilized at the end of the nozzle 131.

Alternatively, a constant bias voltage may be applied to the third electrode 152. In an electrohydrodynamic inkjet apparatus that uses the electrostatic force to discharge a droplet, there is an on-set voltage with which the droplet starts being discharged with respect to the nozzle 131 having a specific size and the ink having a specific dielectric constant. The bias voltage may be equal to or lower than the on-set voltage.

Figure 3A:
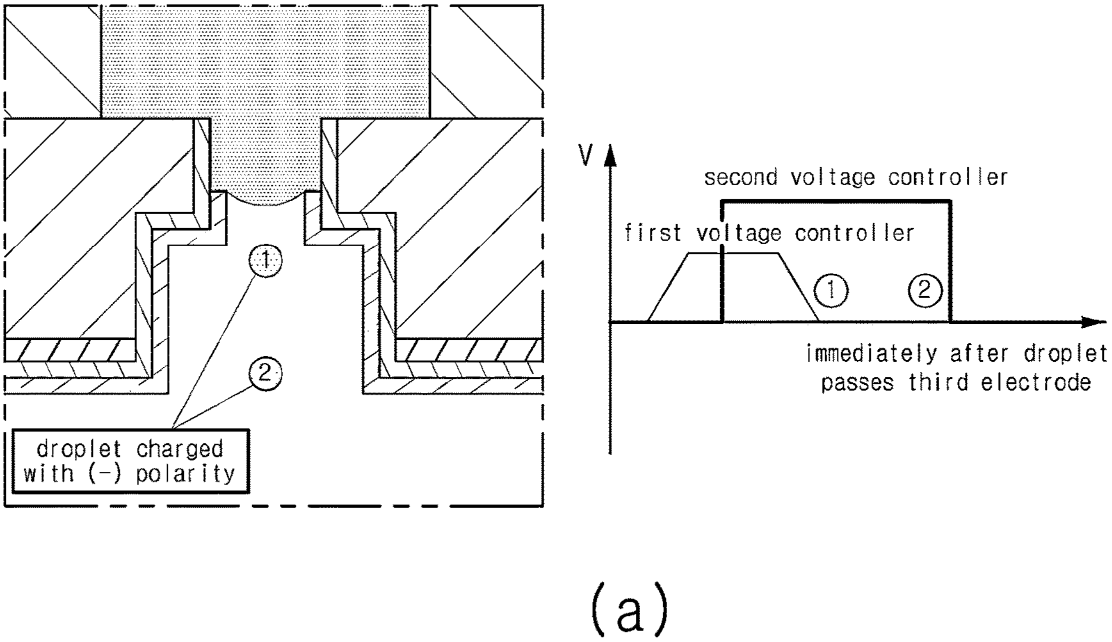
FIGS. 3A and 3B are views showing synchronous signals of a first voltage controller and a second voltage controller according to an embodiment of the disclosure.
Figure 3B:
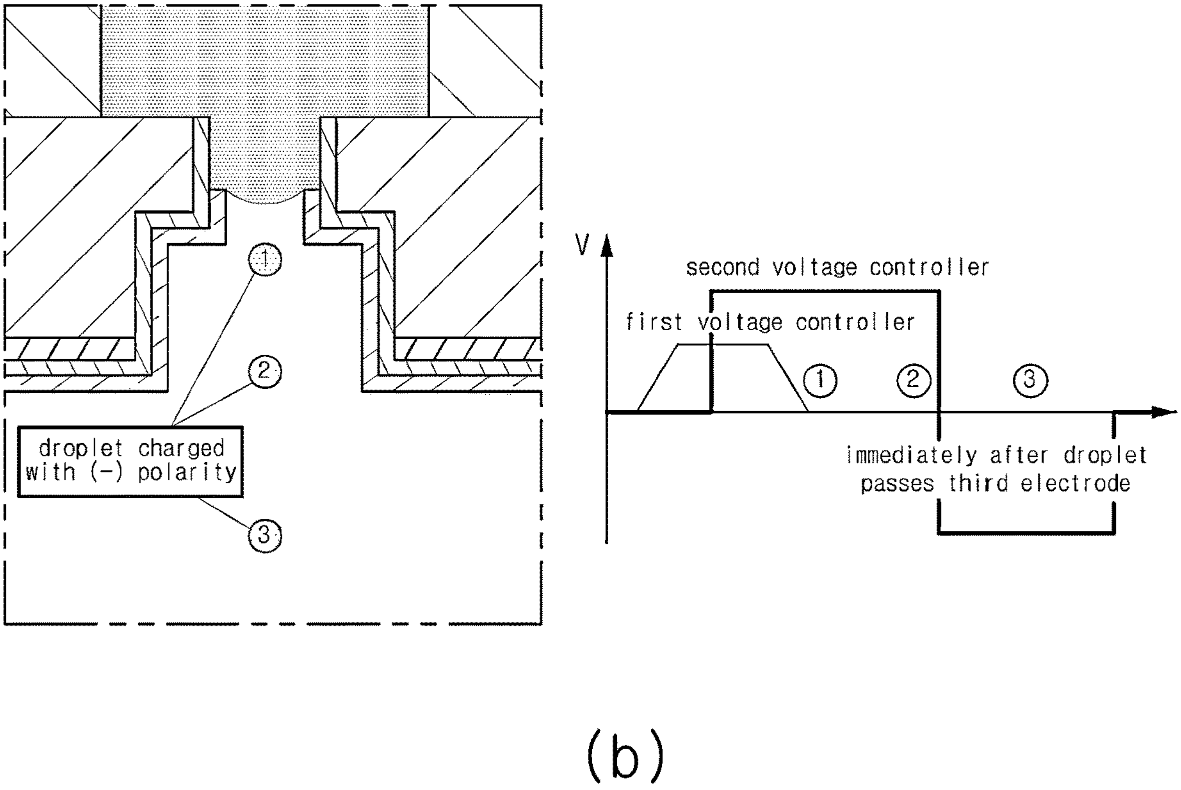

As shown in FIGS. 3A and 3B, the second voltage controller 155 may apply high voltage to the third electrode 152 from time when the meniscus at the end of the nozzle 131 starts becoming convex by positive pressure as the first voltage controller 145 applies a voltage pulse for driving the piezoelectric body 142 and the pressure wave is transferred to the end of the nozzle 131. In other words, when the surface of liquid at the end of the nozzle 131 forms a convex meniscus, electrohydrodynamic discharge may actually start. The discharge in a given nozzle 131 may begin as an electric field is applied to a surrounding area of the nozzle 131 by the third electrode 152. Preferably, the electric field is generated by difference in electric potential between the ink grounded or charged with specific polarity and the third electrode 152. The ink does not need to be grounded, but may be grounded to make the ink including charged particles or the like have uniform potential difference.

Due to an electric field generated when high voltage is applied to the third electrode 152, the surface of the ink forming the convex meniscus may be charged. By interaction between the charged ink meniscus and the electric field, force is generated to change the shape of the meniscus. When the electric field is strengthened to make the convex meniscus become more convex by increasing the potential difference between the third electrode 152 and the ink until stress electrically induced on the meniscus overcomes the surface tension of the ink, the discharge of the droplet may occur.

In this case, although not shown, a separate electrode for generating the electric field together with the third electrode 152 may be additionally provided under a printing medium.

As shown in FIG. 3A, the voltage applied to the third electrode 152 may be controlled to fall to 0V after a droplet is detached from the meniscus formed at the end of the nozzle 131 by the voltage V applied to the third electrode 152 and passes the third electrode 152. Alternatively, as shown in FIG. 3B, the applied voltage may be controlled to have the opposite polarity (−V') after a droplet is detached from the meniscus formed at the end of the nozzle 131 by the voltage V applied to the third electrode 152 and passes the third electrode 152.

If voltage having the same polarity is continuously applied to the third electrode 152 even after the droplet passes the third electrode 152, force of attraction acts to pull the droplet in the opposite direction to the discharging direction, thereby making the move of droplets unstable and causing wetting. Thus, according to the disclosure, the voltage applied to the third electrode 152 is controlled to fall to 0V or to have the opposite polarity after the droplet passes the third electrode 152, thereby solving the foregoing problems. When the voltage having the opposite polarity is applied after the droplet passes the third electrode 152, force of repulsion may act on the droplet by the third electrode 152.

Therefore, according to the disclosure, as shown in FIGS. 3A and 3B, the first voltage controller 145 and the second voltage controller 155 may apply synchronized voltages to the two electrodes 141 and 142 of the piezoelectric actuator 140 and the third electrode 152, respectively.

In more detail with respect to the synchronization, when defined that the pulse time applied from the first voltage controller 145 is t1, the waiting time until the next pulse voltage is applied is t6, the time between when the pulse voltage is applied from the first voltage controller 145 and the voltage is applied from the second voltage controller 155 is t2, the pulse time applied from the second voltage controller 155 is t3 (FIG. 3A), and when an AC voltage is applied from the second voltage controller 155 (FIG. 3B) a pulse time of one polarity is t4, and a pulse time of the opposite polarity is t5, Since the basic meniscus is formed by the voltage applied from the first voltage controller 145 and the droplet is jetted by the voltage applied from the second voltage controller 155, it must be synchronized with the following conditions.

(1) $t1+t6 \geq t2+t3$ or $t1+t6 \geq t2+t4+t5$ (2) $t1 \geq t2$ (3) t3 or t4 is applied until the droplet is formed (4) $t4 \leq t3$, t5 accelerates the droplet According to the disclosure, the third electrode 152 is formed below the nozzle 131 and separated from the nozzle 131 by the insulating layer 151. Therefore, the insulating layer 151, by which the third electrode 152 and the ink can be separated, inhibits an oxidation-reduction reaction between the ink and the third electrode 152 when high voltage is applied to the third electrode 152, and solves problems such as heat generation, ink denaturalization, bubble generation, nozzle clogging, etc. due to the oxidation-reduction reaction.

Although the third electrode 152 separated by the insulating layer 151 does not directly apply electric charges to a liquid surface of the nozzle 131, it is possible to concentrate induced charges on the liquid surface of the nozzle. Therefore, according to the disclosure, the droplets are discharged toward the printing medium by electrostatic force generated by induced charges when high voltage is applied to the third electrode 152.

According to the disclosure, the nozzle 131 is provided as a multi-nozzle. The droplets discharged through the multi-nozzle may be different in size from each other. A conventional inkjet printhead using only the driving force of the piezoelectric body is capable of discharging droplets at an ultrahigh frequency of 100 kHz, but has a problem in that deviation in size between the droplets from the multi-nozzle is large. Accordingly, a drive per nozzle (DPN) inkjet printhead has been developed to individually control the piezoelectric body for each nozzle, but problems arise in that there is difficulty in the individual control, and it is difficult to optimize the shape of pulses for controlling the piezoelectric body for each nozzle. On the other hand, according to the disclosure, the first voltage controller 145 controls voltage to be equally applied to the piezoelectric actuators 140 respectively corresponding to the nozzles 131, and the second voltage controller 155 controls the voltage applied to the third electrode 152 to be different in level and frequency according to the nozzles 131, thereby controlling the droplets discharged from the multi-nozzle to be uniform in size. It is much simpler to control the size of droplet based on the level of high voltage applied to the third electrode 152 than to control each pulse voltage for the piezoelectric actuator 140.

According to the disclosure, the diameter of the droplet may be considerably smaller than the diameter of the nozzle 131 from which the droplet is discharged. In general, the convex meniscus has a diameter given as the outer diameter of the entrance of the nozzle 131. According to the disclosure, the diameter of the droplet may be adjusted within a range from about 1/20 of the diameter of the nozzle 131 to the same diameter as the nozzle 131, by adjusting the voltage applied to the nozzle 131. However, in principle, a droplet smaller than 1/20 of the diameter of the nozzle 131 may also be producible. Depending on change in voltage, a droplet is varied in size. The droplet is increased in diameter as voltage increases between the minimum extraction voltage at which the applied voltage is needed for discharging the droplet and an extraction voltage approximately twice the minimum extraction voltage, and a diameter change rate of the droplet is decreased as the extraction voltage increases.

The use of the nozzle 131 having a large diameter to produce much smaller droplets has various advantages. First, it is much easier to manufacture the nozzle 131 having a large diameter by the existing manufacturing method. Lowe resolution requirements may have a significant effect on costs and time required for manufacturing the printhead. Next, it is much faster to print a structure on a predetermined area of the substrate at a given resolution through the nozzle 131 having a large diameter. Further, when the discharged droplet has a diameter considerably smaller than the diameter of the nozzle 131, the discharging amount and the droplet size are much less affected by change in voltage. Accordingly, the droplets deposited by the nozzles 131 can have the same diameter and be discharged at the same frequency even though there is a slight difference in diameter between the manufactured nozzles 131. Besides, the nozzles are free from being clogged with contaminants or ink attached to and dried on the printhead. In addition, it is easier to clean the nozzle 131 having a larger diameter.

Figure 4:
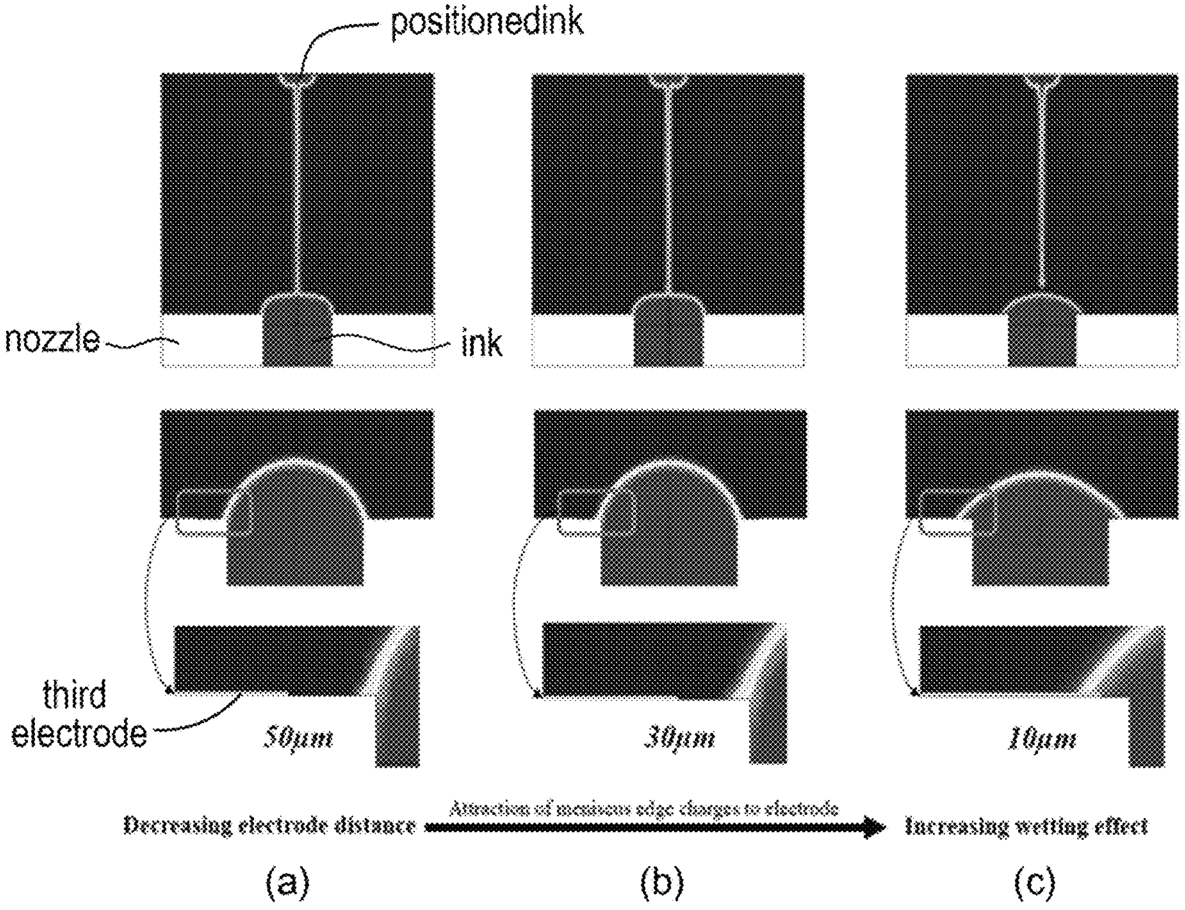
FIG. 4 illustrates simulation results of meniscus shapes according to horizontal distances between a nozzle and a third electrode.

As shown in FIG. 1, the third electrode 152 may be formed encompassing the nozzle 131 below the end of the nozzle 131. FIG. 4 shows simulation results of effects on a liquid surface of a meniscus according to horizontal distances b between the third electrode 152 and the nozzle 131. When the horizontal distance b between the third electrode 152 and the nozzle 131 gets shorter into 50 μm, 30 μm and 10 μm, wetting effects are increased as the third electrode 152 more attracts the edges of the meniscus. Therefore, the horizontal distance b between the third electrode 152 and the nozzle 131 needs to be designed to be greater than or equal to a predetermined minimum distance in order to inhibit the wetting effects due to the force of attraction of the third electrode 152. In this case, the minimum distance may increase as the diameter of the nozzle 131 increases.

Figure 5A:
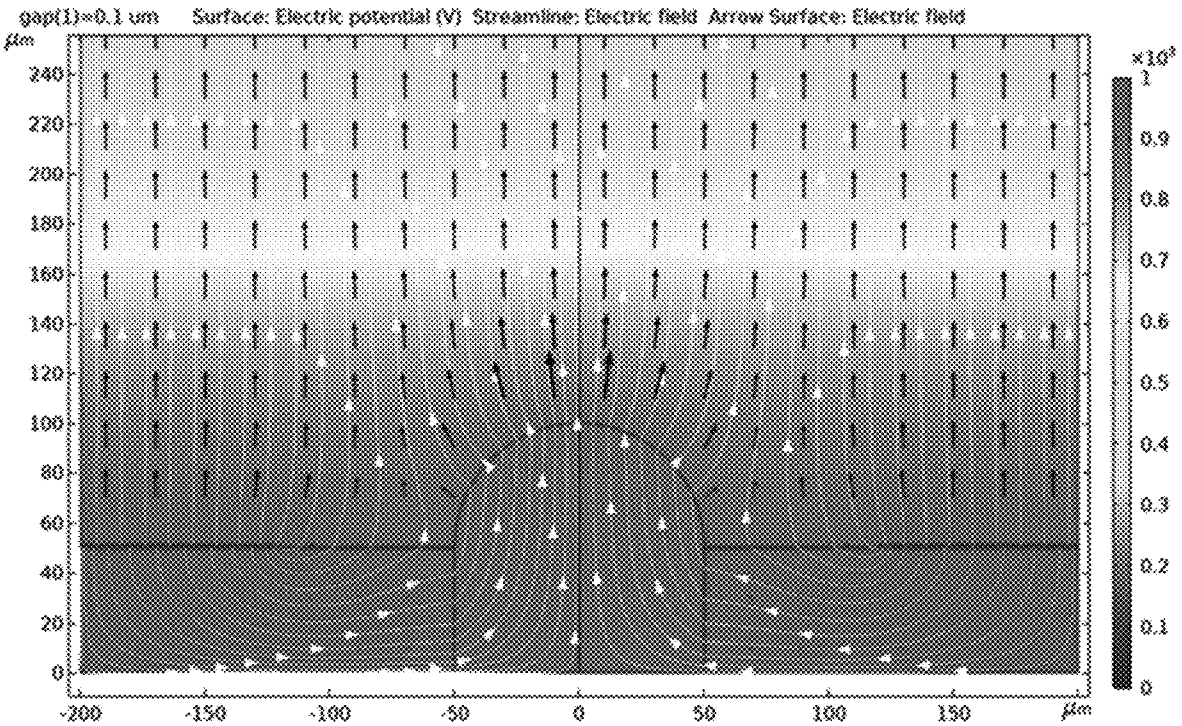
FIGS. 5A and 5B illustrate simulation results of electric field distributions according to vertical distances between the nozzle and the third electrode.
Figure 5B:
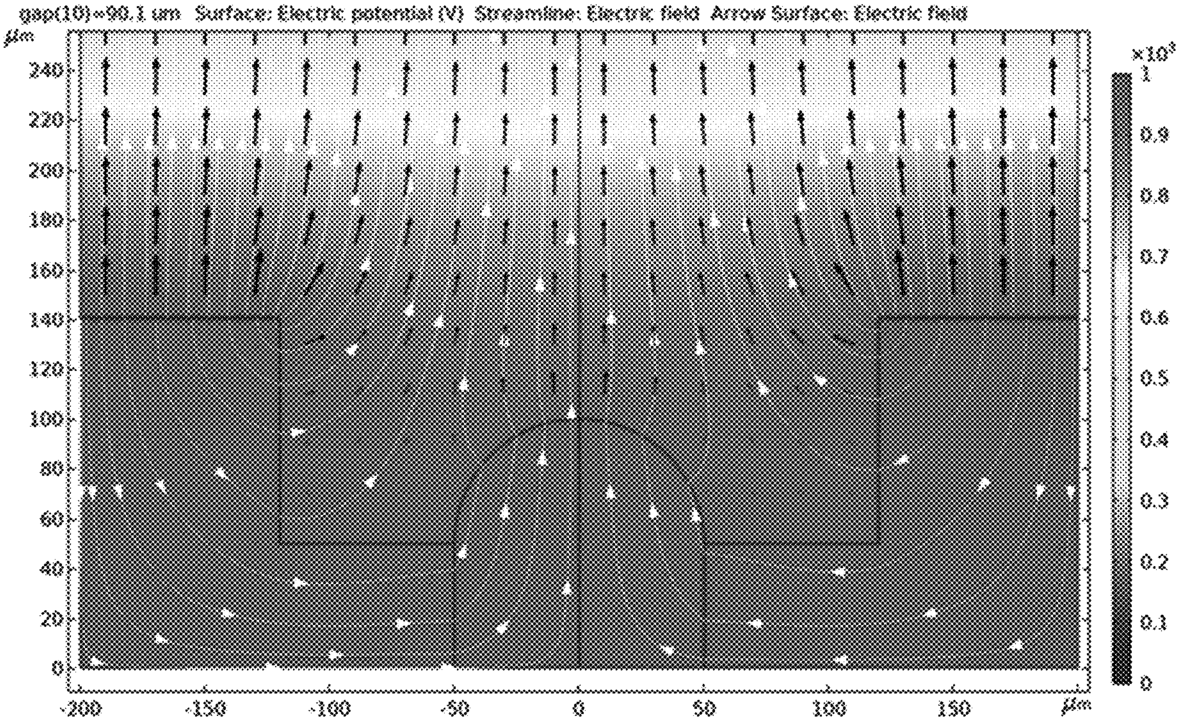

FIGS. 5A and 5B show simulation results of effects on distribution of an electric field according to vertical distances a between the third electrode 152 and the end of the nozzle 131. As the vertical distance a between the third electrode 152 and the nozzle 131 gets shorter, the droplet discharging energy increases due to the effects of the electric field but the concentration of the electric field decreases (see FIG. 5A). On the other hand, as the vertical distance a between the third electrode 152 and the nozzle 131 gets longer, the droplet discharging energy decreases but the concentration of the electric field increases (see FIG. 5B). When the concentration of the electric field decreases, the droplet may become unstable. Accordingly, the optimum vertical distance a between the third electrode 152 and the nozzle 131 is designed by taking the discharging energy of the droplet and the concentration of the electric field into account.

Further, the vertical distance a between the third electrode 152 and the nozzle 131 is much shorter than the distance between the printhead and the printing medium. Therefore, a strong electric field is locally formed around the nozzle 131 by not the distance between the printhead and the printing medium but the third electrode 152.

Below, an inkjet printhead according to a second embodiment of the disclosure will be described with reference to FIGS. 6 to 8.

Figure 6:
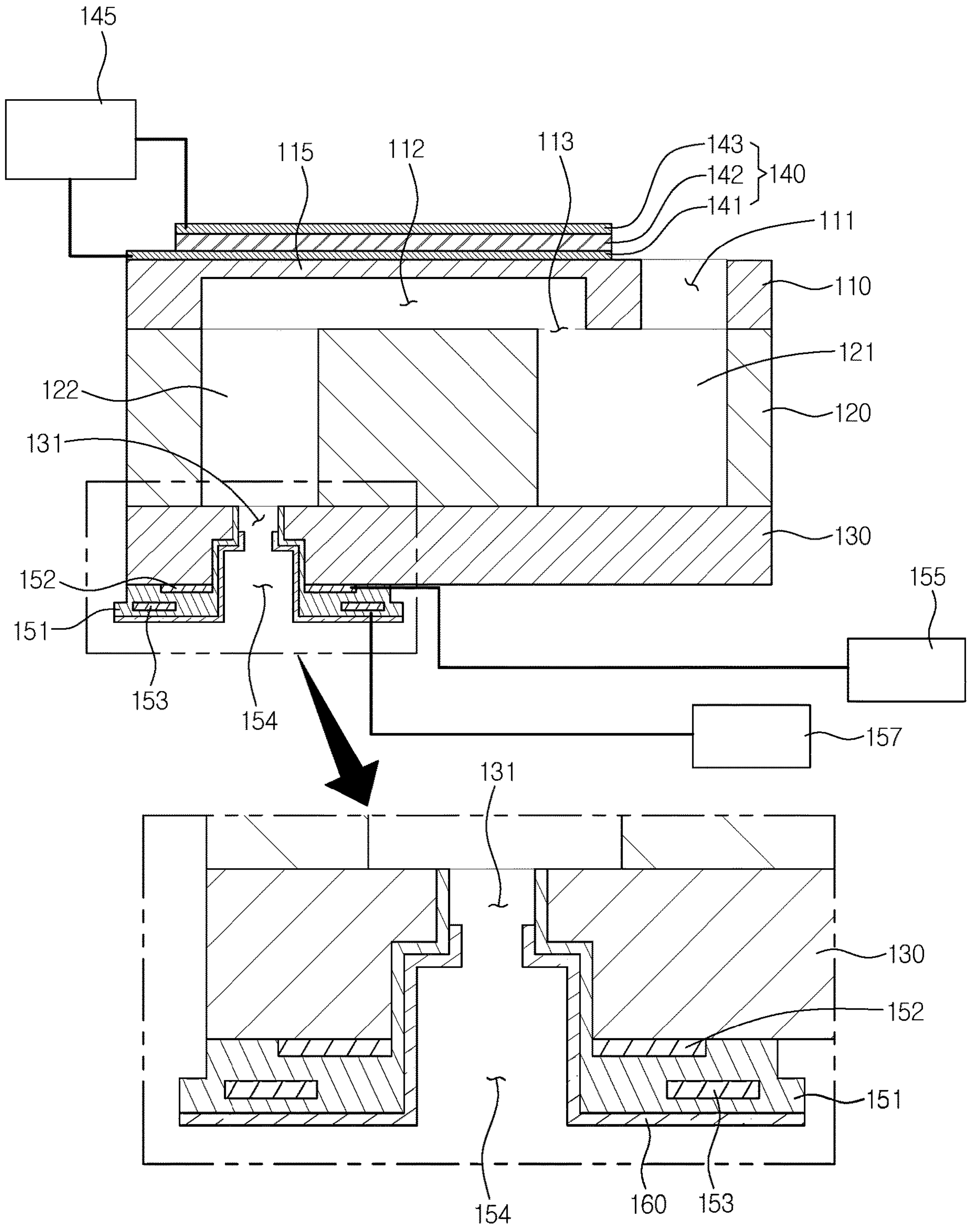
FIG. 6 is a cross-sectional view of an inkjet printhead according to a second embodiment of the disclosure.
Figure 7:
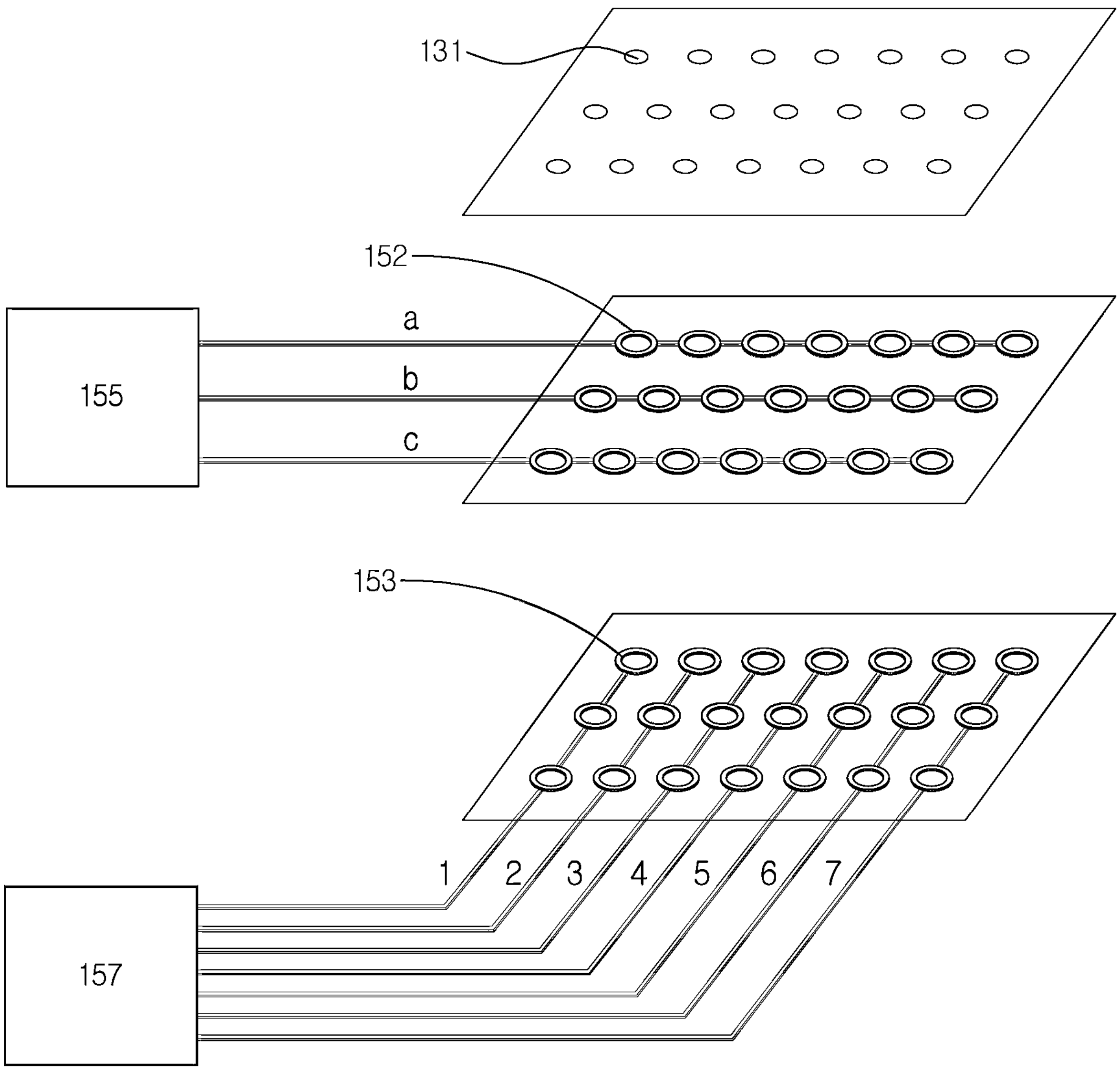
FIG. 7 illustrates a voltage applying structure of a third electrode and a fourth electrode.
Figure 8:
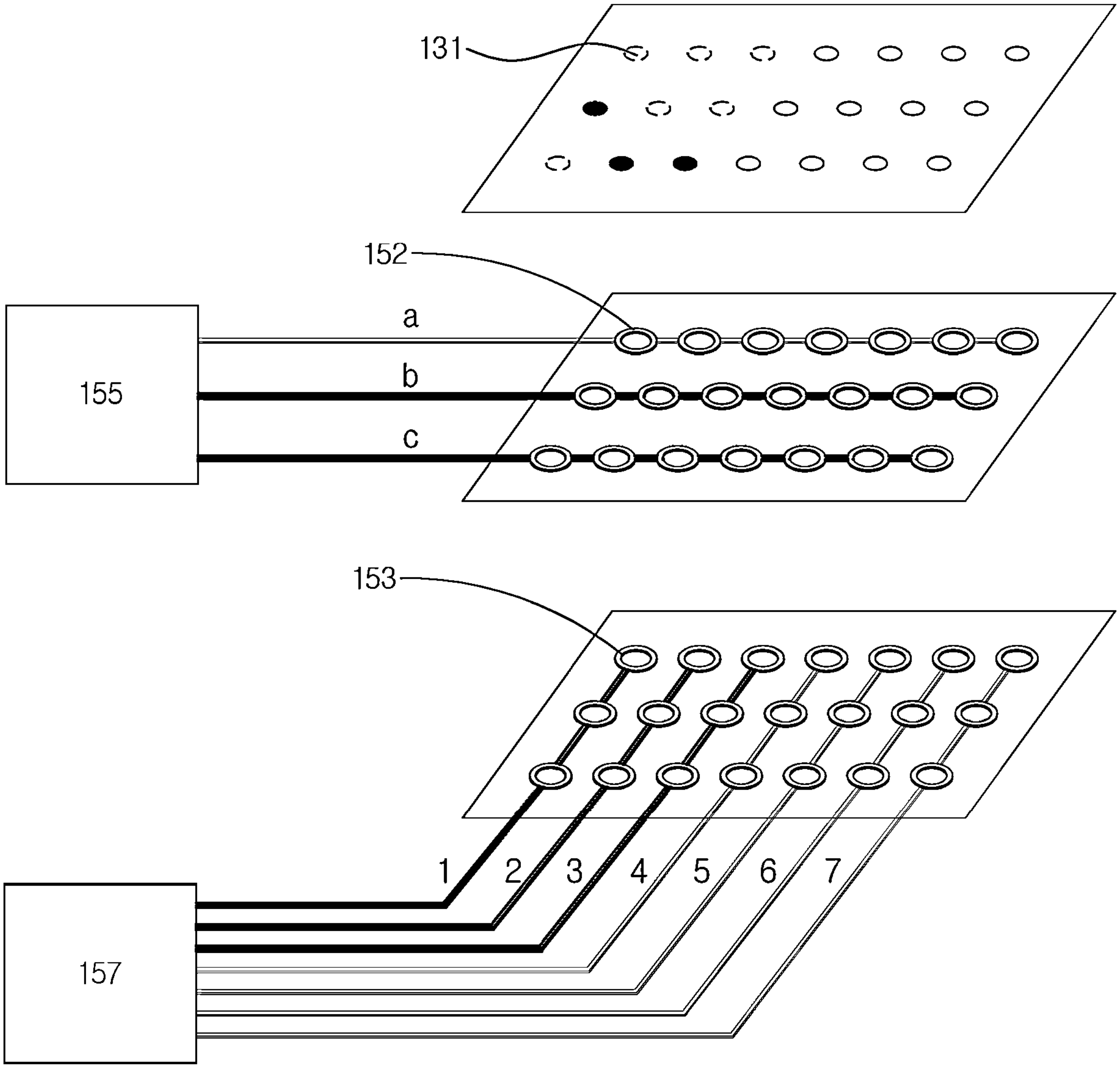
FIG. 8 illustrates a voltage applying operation when ink is discharged from only some nozzles among the nozzles.

FIG. 6 is a cross-sectional view of an inkjet printhead according to a second embodiment of the disclosure, FIG. 7 illustrates a voltage applying structure of a third electrode and a fourth electrode, and FIG. 8 illustrates a voltage applying operation when ink is discharged from only some nozzles among the nozzles.

In terms of describing the second embodiment, descriptions will be made focusing on differences from the foregoing embodiment.

Even in this embodiment, the inkjet printhead has a three-layered structure of the chamber layer 110, the channel layer 120 and the nozzle layer 130.

As described above, the third electrode 152 coated with the insulating layer 151 is disposed beneath the bottom of the nozzle layer 130. The third electrode 152 and a fourth electrode 153 are all disposed inside the insulating layer 151 beneath the nozzle layer 130, in which the fourth electrode 153 is disposed below and spaced apart from the third electrode 152, and the horizontal distance between the fourth electrode 153 and the nozzle 131 is designed to be longer than the horizontal distance between the third electrode 152 and the nozzle 131.

The hydrophobic coating layer 160 coated with a hydrophobic material may be formed beneath the insulating layer 151 surrounding the third electrode 152 and the fourth electrode 153.

A third voltage controller 157 applies voltage to the fourth electrode 153.

When a droplet is formed and discharged by induced electrostatic force of the third electrode 152 and the pressure wave caused by the piezoelectric body 142 as the first voltage controller 145 applies voltage to the electrodes 141 and 143 of the piezoelectric actuator 140 and the second voltage controller 155 applies voltage to the third electrode 152, the third voltage controller 157 applies voltage for forming the electrostatic force to the fourth electrode 153, thereby narrowing a discharging angle of droplets and reinforcing a discharging speed. In this case, the voltage applied to the fourth electrode 153 is synchronized to have the same phase as the voltage applied to the third electrode 152.

The vertical distance between the third electrode 152 and the end of the nozzle 131 is much shorter than the distance between the printhead and the printing medium. Therefore, a strong electric field is locally formed around the nozzle 131 by not the distance between the printhead and the printing medium but the third electrode 152.

By limiting the width of the third electrode 152, it is possible to limit the area of the strong electric field to a place where the individual nozzles 131 is positioned, in a transverse direction, and narrow the distance between the nozzles 131. However, when the distance from the neighboring third electrodes 152 becomes closer, the electric field of the neighboring nozzle 131 may be affected. Thus, the fourth electrode 153 is useful for inhibiting the non-uniformity and transverse deflection of the electric field as affected by the electric field from the neighboring third electrode 152.

The third electrode 152 needs to have the same polarity and a preferably higher amplitude as compared to extraction potential applied to liquid potential while the droplets are discharged, with regard to the droplets discharged as accelerated in an intended direction, i.e., a discharging direction. The accelerating electric field may be accurately orthogonal to the surface of the printing medium or the printhead, so that the droplet can be accelerated in a direction perpendicular to the surface of the printhead without being deflected in the transverse direction.

Voltage applied to the fourth electrode 153 may be a direct current (DC) voltage, and may preferably be given in the form of a continuous signal having a constant or variable amplitude. Alternatively, the applied voltage may be an AC voltage, and may preferably be given in the form of a periodic function having a 20 Hz to 20 kHz.

The inkjet printhead according to the disclosure may include the plurality of nozzles 131 arranged in a row direction and a column direction, forming a matrix. FIG. 7 shows an example that the nozzles 131 are arranged in a matrix having three rows and seven columns, but the arrangement of the nozzles 131 is not limited to this example.

Under the nozzles 131, the third electrode 152 and the fourth electrode 153 surrounded with the insulating layer 151 may be arranged. In this case, the plurality of third electrodes 152 arranged in one of the row and column directions may be electrically connected in a straight line. FIG. 7 shows that seven third-electrodes 152 are electrically connected in the row direction, and thus three rows a, b and c of third electrodes 152 are connected to the second voltage controller 155. Likewise, the fourth electrodes 153 arranged in one of the row and column directions may be electrically connected in a straight line. In this case, the third electrodes 152 and the fourth electrodes 153 are arranged being orthogonal to each other. When the third electrodes 153 are electrically connected in the row direction, the fourth electrode 153 may be electrically connected in the column direction. In FIG. 7, three fourth electrodes are electrically connected in the column direction, and thus seven columns 1, 2, 3, 4, 5, 6 and 7 of fourth electrodes 153 are connected to the third voltage controller 157.

If the plurality of third electrodes 152 and the plurality of fourth electrodes 153 are individually connected to the second voltage controller 155 and the third voltage controller 157, a voltage connection structure (circuit) may be complicated. The complicated voltage connection structure increases the distance between the nozzles 131, so that the plurality of nozzles 131 cannot be compactly arranged. Furthermore, when high voltage is individually applied to the third electrodes 152 and the fourth electrodes 153, the voltage controllers 155 and 157 may be burdened in terms of their capacities. On the other hand, according to the disclosure, the plurality of third electrodes 152 and the plurality of fourth electrodes 153 are electrically connected in the row direction or the column direction, thereby simplifying the voltage connection structure and lessening the burdens of the voltage controllers 155 and 157 in terms of capacity.

To discharge droplets through some nozzles 131 among the plurality of arranged nozzles 131, voltage may be applied to lines connected to the electrodes 152 and 153 corresponding to these nozzles 131. For example, to discharge the droplets through only the nozzles 131 marked in black among the plurality of nozzles 131 as shown in FIG. 8, the second voltage controller 155 and the third voltage controller 157 may apply voltage to the lines b, c, 1, 2 and 3 electrically connected to the third electrodes 152 and the fourth electrodes 153 corresponding to the marked nozzles 131. In other words, the lines b, c, 1, 2 and 3 may be on, but the lines a, 4, 5, 6 and 7 may be off. In this case, only the piezoelectric actuators 140 corresponding to the nozzles 131 marked in black are operated, and the piezoelectric actuators 140 corresponding to the other nozzles 131 are not operated, so that the droplets can be controlled not to be discharged from the other nozzles 131 (marked with a dotted line) to which voltage is applied while the voltage is applied to the lines b, c, 1, 2 and 3.

Below, an inkjet printhead according to a third embodiment of the disclosure will be described with reference to FIGS. 9 and 10.

Figure 9:
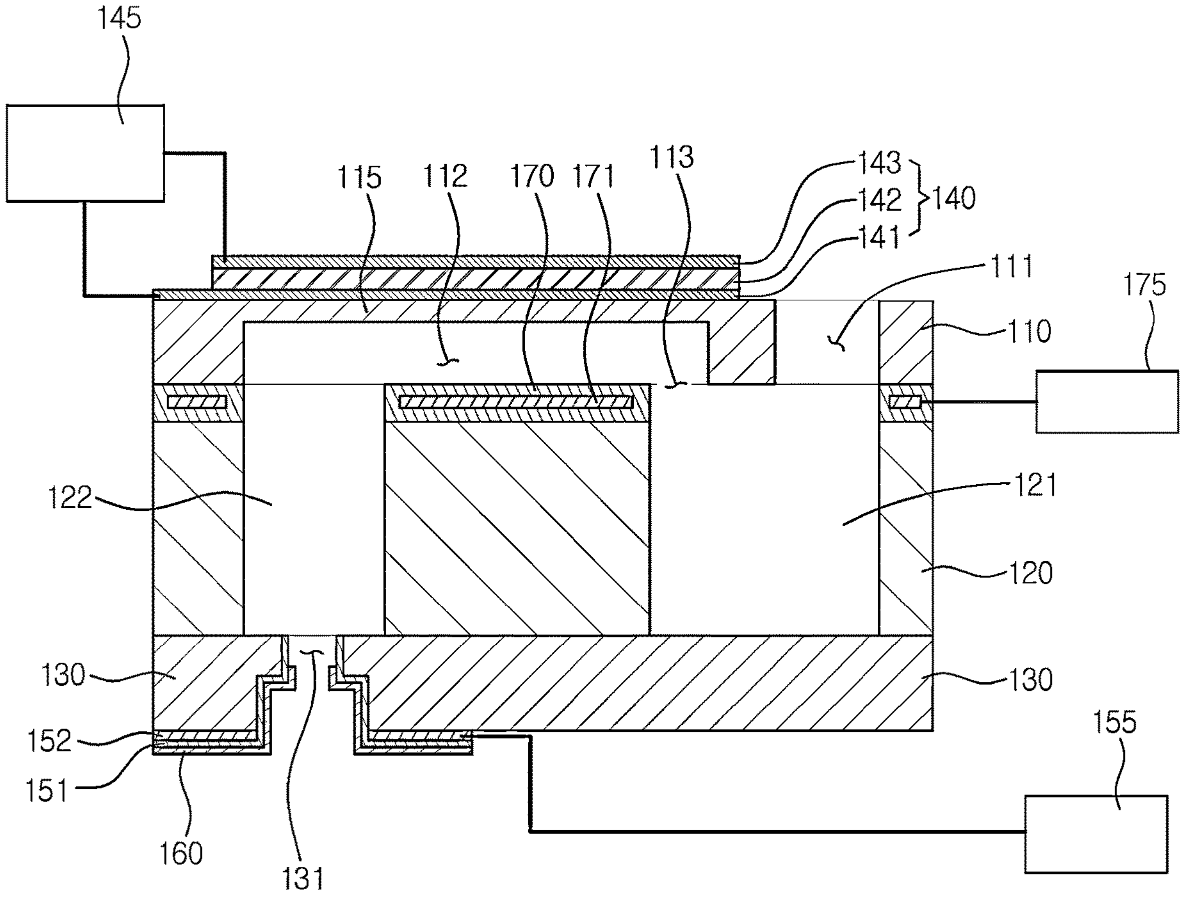
FIG. 9 is a cross-sectional view of an inkjet printhead according to a third embodiment of the disclosure.
Figure 10:
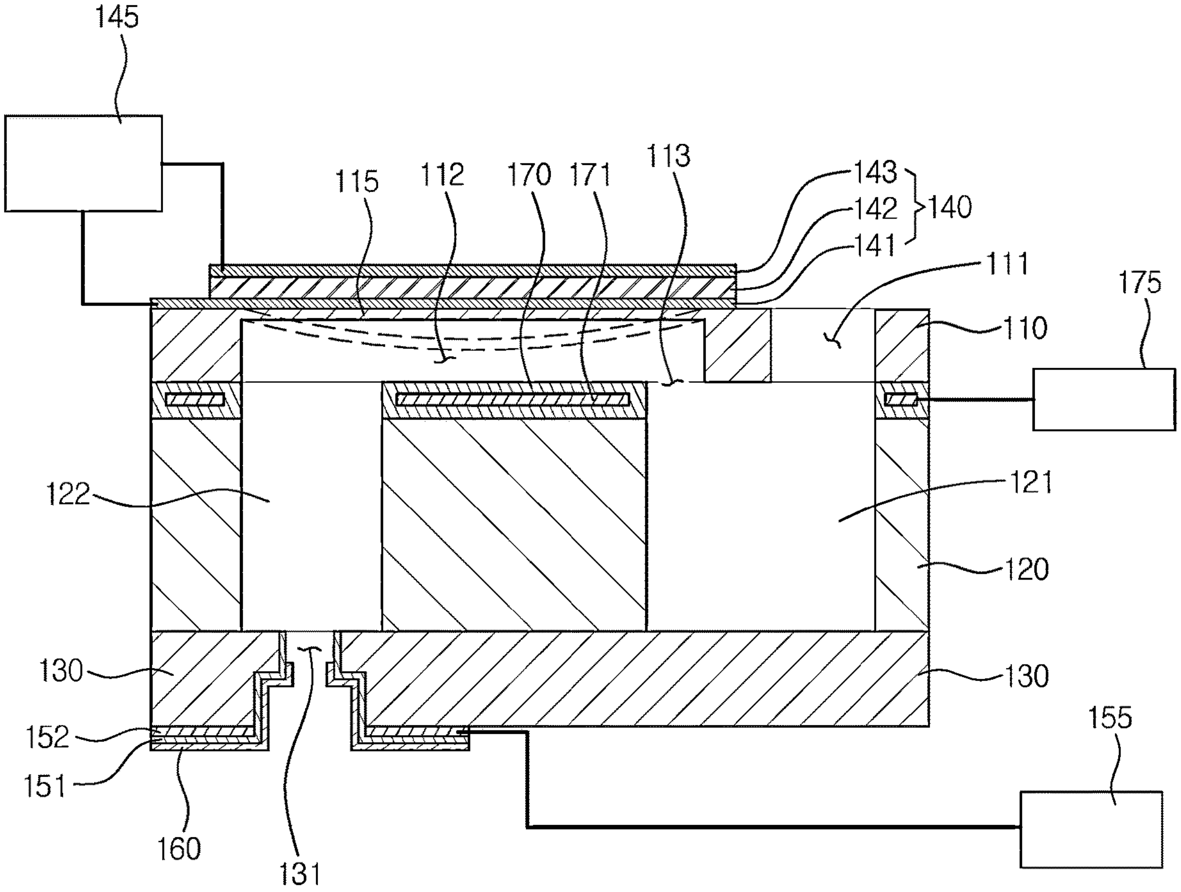
FIG. 10 is a view showing an operation of a membrane based on a piezoelectric body and a fifth electrode of FIG. 9.

FIG. 9 is a cross-sectional view of the inkjet printhead according to the third embodiment of the disclosure, and FIG. 10 is a view showing an operation of a membrane based on a piezoelectric body and a fifth electrode of FIG. 9.

In terms of describing the third embodiment, descriptions will be made focusing on differences from the foregoing embodiments.

Even in this embodiment, the inkjet printhead has a three-layered structure of the chamber layer 110, the channel layer 120 and the nozzle layer 130.

As compared with the first embodiment, this embodiment may additionally include a fifth electrode 171 surrounded with an insulating layer 170 and disposed on the channel layer 120. Therefore, the fifth electrode 171 surrounded with the insulating layer 170 may be disposed between the chamber layer 110 and the channel layer 120.

A fourth voltage controller 175 applies voltage to the fifth electrode 171.

While the plurality of third electrodes 152 are individually and respectively disposed for the nozzles 131, the fifth electrode 171 in this embodiment may form a common electrode with regard to the plurality of nozzles 131. The fifth electrode 171 reinforces induced electric force by the third electrode 152, thereby assisting the ink in forming the meniscus. Actual triggering of droplet detachment may be caused by potential difference from the electrostatic force applied to the third electrode 152. With the fifth electrode 171, it is possible to decrease the minimum extraction voltage of the third electrode 152.

The fifth electrode 171 may be used for generating potential difference from the electrostatic force of the third electrode 152. Optionally, the fifth electrode 171 may receive voltage having the opposite polarity to that of the voltage applied to the third electrode 152, or may serve as the ground for the ink.

Further, the fifth electrode 171, together with the first electrode 141 of the piezoelectric actuator 140, generates the electrostatic force so that the membrane 115 can oscillate based on the electrostatic force. The electrostatic force between the first electrode 141 and the fifth electrode 171 may be added to the driving force of the piezoelectric body 142. Therefore, it is possible to reinforce the oscillation of the membrane 115 and precisely control the discharging force based on the oscillation of the membrane 115.

Below, an inkjet printhead according to a fourth embodiment of the disclosure will be described with reference to FIG. 11.

Figure 11:
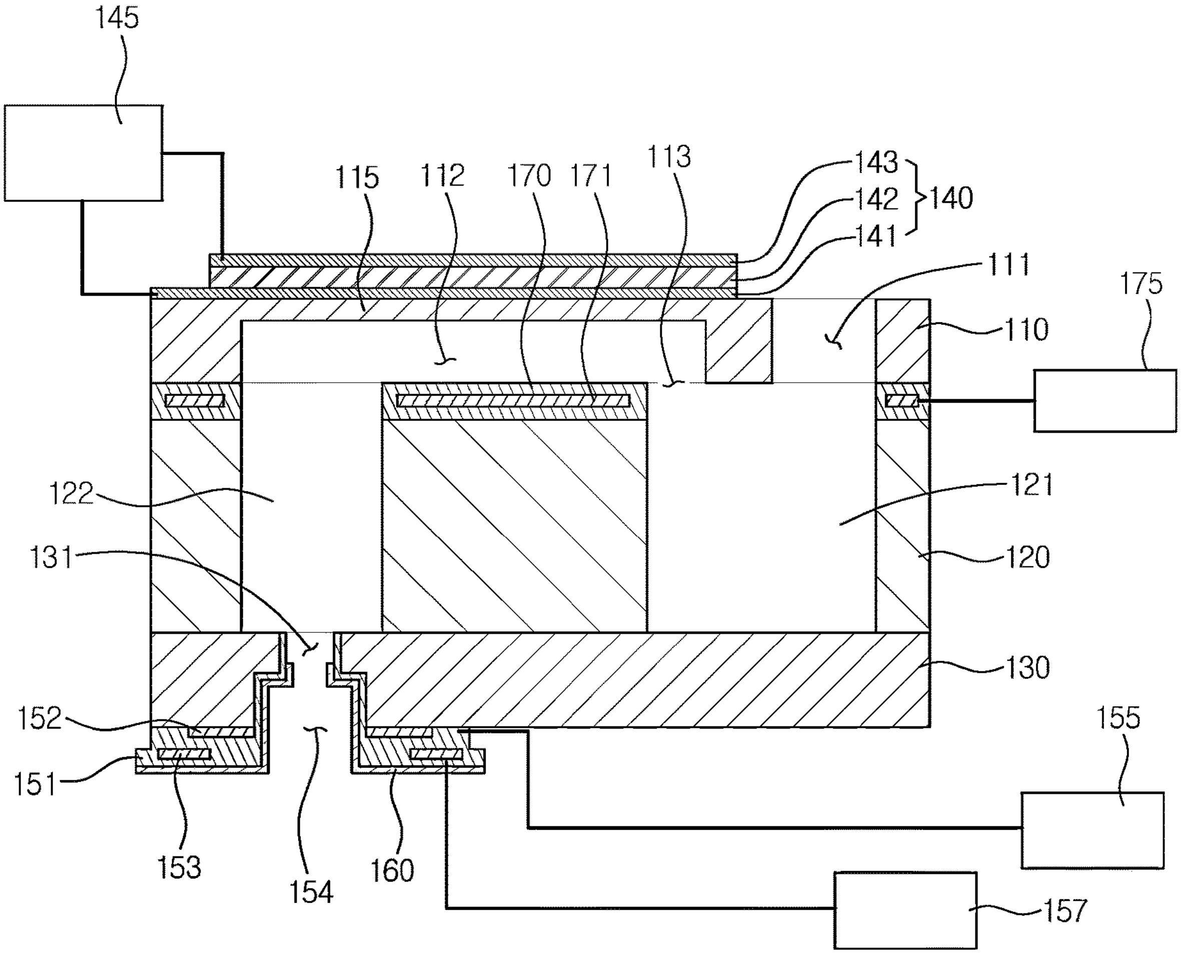
FIG. 11 is a cross-sectional view of an inkjet printhead according to a fourth embodiment of the disclosure.

FIG. 11 is a cross-sectional view of the inkjet printhead according to the fourth embodiment of the disclosure.

In terms of describing the fourth embodiment, descriptions will be made focusing on differences from the foregoing embodiments.

Even in this embodiment, the inkjet printhead has a three-layered structure of the chamber layer 110, the channel layer 120 and the nozzle layer 130.

In this embodiment, the fourth electrode 153 according to the second embodiment may be additionally provided. As described above, the third electrode 152 coated with the insulating layer 151 is disposed beneath the nozzle layer 130. The third electrode 152 and the fourth electrode 153 are all disposed inside the insulating layer 151 beneath the nozzle layer 130, in which the fourth electrode 153 is disposed below and spaced apart from the third electrode 152, and the horizontal distance between the fourth electrode 153 and the nozzle 131 is designed to be longer than the horizontal distance between the third electrode 152 and the nozzle 131.

The hydrophobic coating layer 160 coated with a hydrophobic material may be formed beneath the insulating layer 151 surrounding the third electrode 152 and the fourth electrode 153.

The third voltage controller 157 applies voltage to the fourth electrode 153.

When a droplet is formed and discharged by induced electrostatic force of the third electrode 152 and the pressure wave caused by the piezoelectric body 142 as the first voltage controller 145 applies voltage to the electrodes 141 and 143 of the piezoelectric actuator 140 and the second voltage controller 155 applies voltage to the third electrode 152, the third voltage controller 157 applies voltage for forming the electrostatic force to the fourth electrode 153, thereby narrowing a discharging angle of droplets and reinforcing a discharging speed. In this case, the voltage applied to the fourth electrode 153 is synchronized to have the same phase as the voltage applied to the third electrode 152.

The vertical distance between the third electrode 152 and the end of the nozzle 131 is much shorter than the distance between the printhead and the printing medium. Therefore, a strong electric field is locally formed around the nozzle 131 by not the distance between the printhead and the printing medium but the third electrode 152.

Further, in this embodiment, the fifth electrode 171 according to the third embodiment may be additionally provided.

In more detail, the fifth electrode 171 coated with the insulating layer 170 may be additionally disposed on the channel layer 120. Therefore, the insulating layer 170 may be disposed between the chamber layer 110 and the channel layer 120.

The fourth voltage controller 175 applies voltage to the fifth electrode 171.

Thus, according to this embodiment, the force of the pressure wave based on the oscillation of the piezoelectric body 142 by the first voltage controller 145 and the piezoelectric actuator 140, the force of induced electrostatic force by the second voltage controller 155 and the third electrode 152, the auxiliary force of the induced electrostatic force by the third voltage controller 157 and the fourth electrode 153, and the force of the pressure wave based on the induced electrostatic force or the electrostatic force by the fourth voltage controller 175 and the fifth electrode 171 are combined to produce the droplet at the end of the nozzle 131 and discharge the droplet while precisely controlling the discharging speed and direction of the droplet.

Below, a method of manufacturing an inkjet printhead according to an embodiment of the disclosure will be described with reference to FIGS. 12 to 15.

Figure 12:
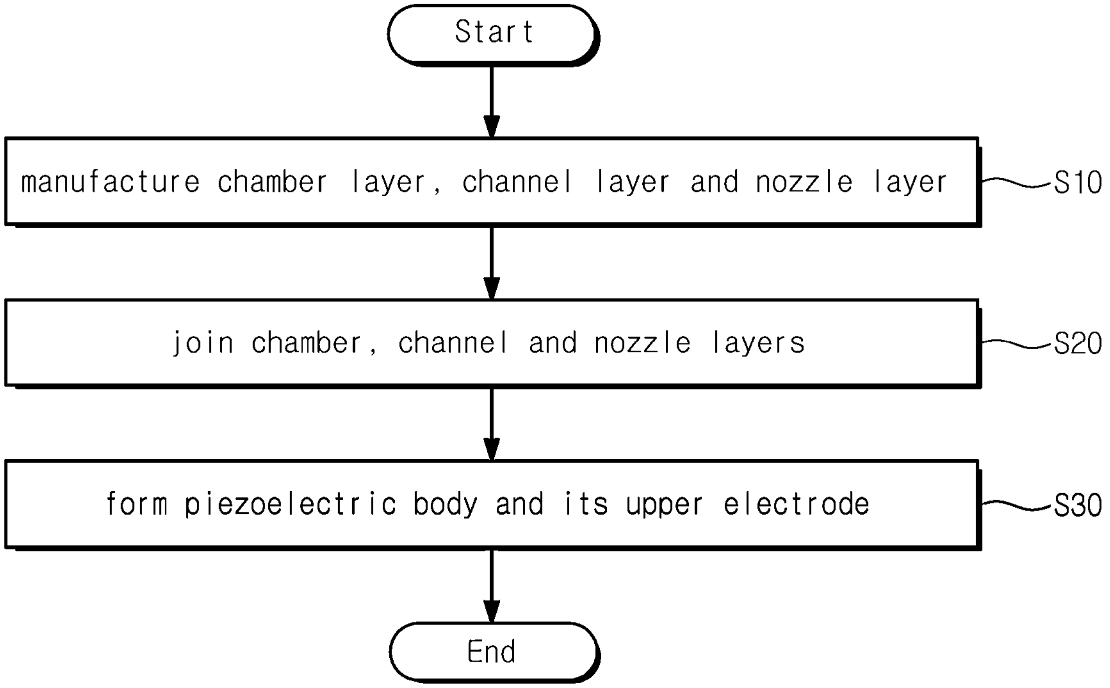
FIG. 12 is a flowchart showing a method of manufacturing an inkjet printhead according to an embodiment of the disclosure.
Figure 13:
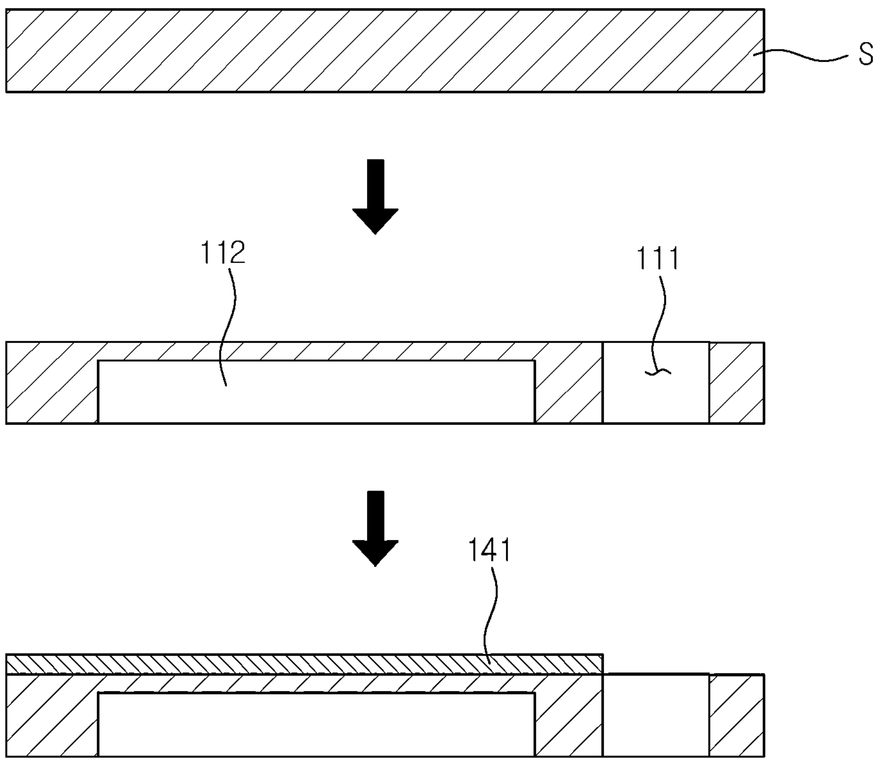
FIG. 13 is a view showing a method of manufacturing a chamber layer.
Figure 14:
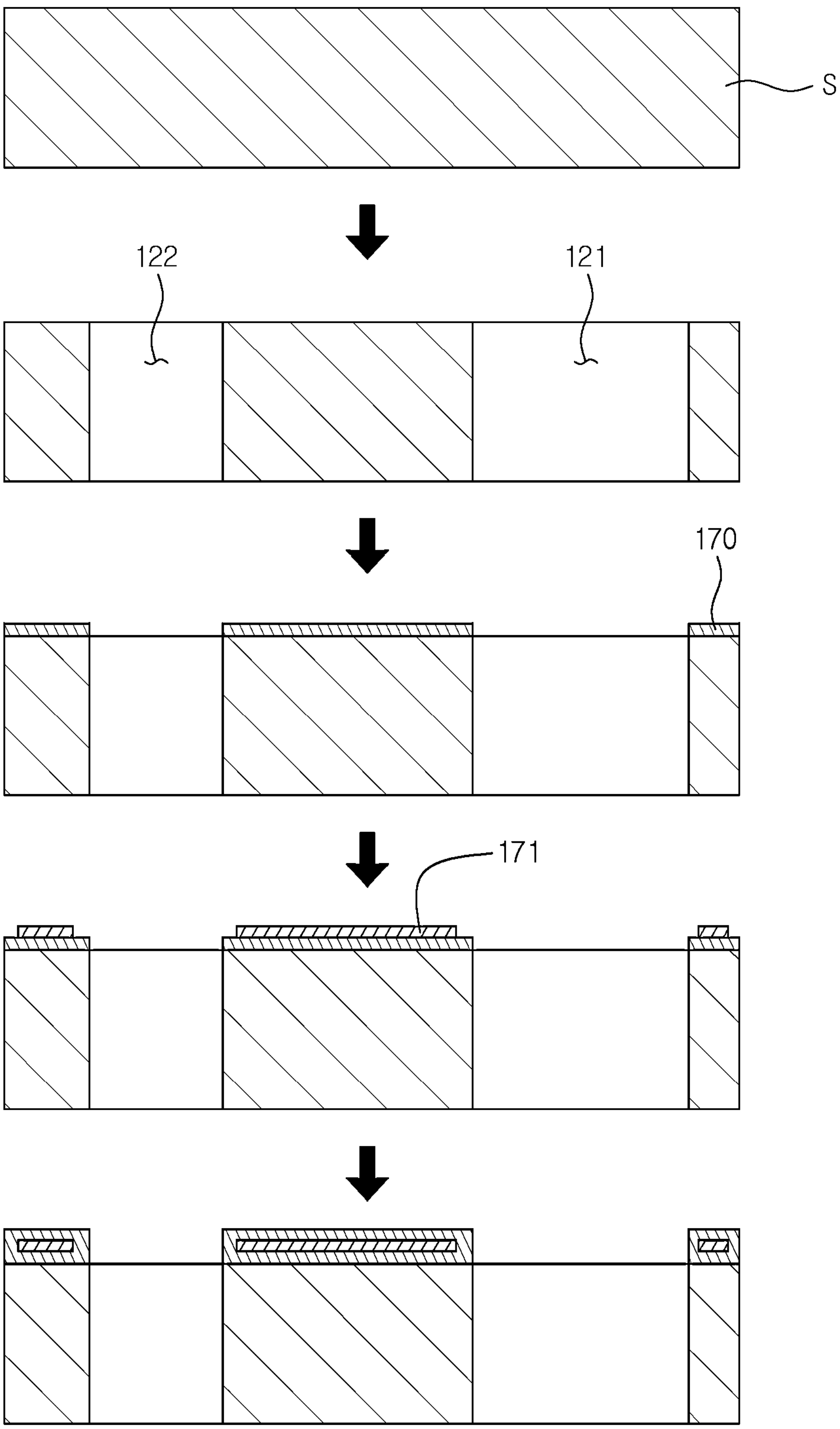
FIG. 14 is a view showing a method of manufacturing a channel layer.

FIG. 12 is a flowchart showing a method of manufacturing an inkjet printhead according to an embodiment of the disclosure, FIG. 13 is a view showing a method of manufacturing a chamber layer, FIG. 14 is a view showing a method of manufacturing a channel layer, and FIG. is a view showing a method of manufacturing a nozzle layer.

The method of manufacturing the inkjet printhead according to an embodiment of the disclosure includes the steps of manufacturing the chamber layer 110 (or a first layer), the channel layer 120 (or a second layer), and the nozzle layer 130 (or a third layer) (S10); joining the chamber layer 110, the channel layer 120, and the nozzle layer 130 (S20); and forming the piezoelectric body 142 and the second electrode 143 of the piezoelectric actuator 140 on the chamber layer 110 (S30).

The step of manufacturing the chamber layer 110 is illustrated in FIG. 13.

The chamber layer 110 may be manufactured with a silicon-on-insulator (all) wafer S. The thickness of the SOI wafer S is adjusted to a designed value by a chemical mechanical planarization (CMP) process, and then Si is etched by a photo process and an etching process to process the plurality of chambers 112, thereby forming the membrane 115 on each chamber 112. Further, the inlet 111 is formed to penetrate the SOI wafer S. Next, a lower electrode of the piezoelectric actuator 140, i.e., the first electrode 141 is formed on the chamber layer 110 by using a shadow mask and a sputter.

The step of manufacturing the channel layer 120 is illustrated in FIG. 14.

The channel layer 120 may be manufactured with either an Si wafer S or a glass wafer S. In the case of the Si wafer S, the photo process and the etching process may be used like the method of manufacturing the chamber layer 110 when the manifold 121 and the plurality of nozzle channels 122 are formed. In this case, the channel layer 120 is manufactured to have a thickness of 400 μm to 500 μm. In the case of using the glass wafer S, etching may be performed using a sand blast for chemical or physical etching. The induced electrostatic force may be reinforced by adding the fifth electrode 171 surrounded with the insulating layer 170 onto the channel layer 120, and the oscillation of the membrane 115 may be reinforced by the electrostatic force.

In this case, the fifth electrode 171 may be insulated by a dielectric material. After depositing the insulating layer 170 of $SiO_2$ on the wafer of the channel layer 120, the shadow mask is aligned and the sputter is used to form a metal layer (i.e., the fifth electrode 171). Next, the metal layer is protected with the insulating layer 170 of $SiO_2$, so as not to be in direct contact with the ink. In the case of the glass wafer S, the shadow mask and the sputter are directly used to deposit the metal layer because the glass wafer S itself is an insulating material, and then the metal layer is protected by depositing the insulating layer 170 on the entire surface of the metal layer so as not to be in contact with ink.

In the foregoing first and second embodiments, the insulating layer 170 and the fifth electrode 171 may be omitted.

Figure 15:
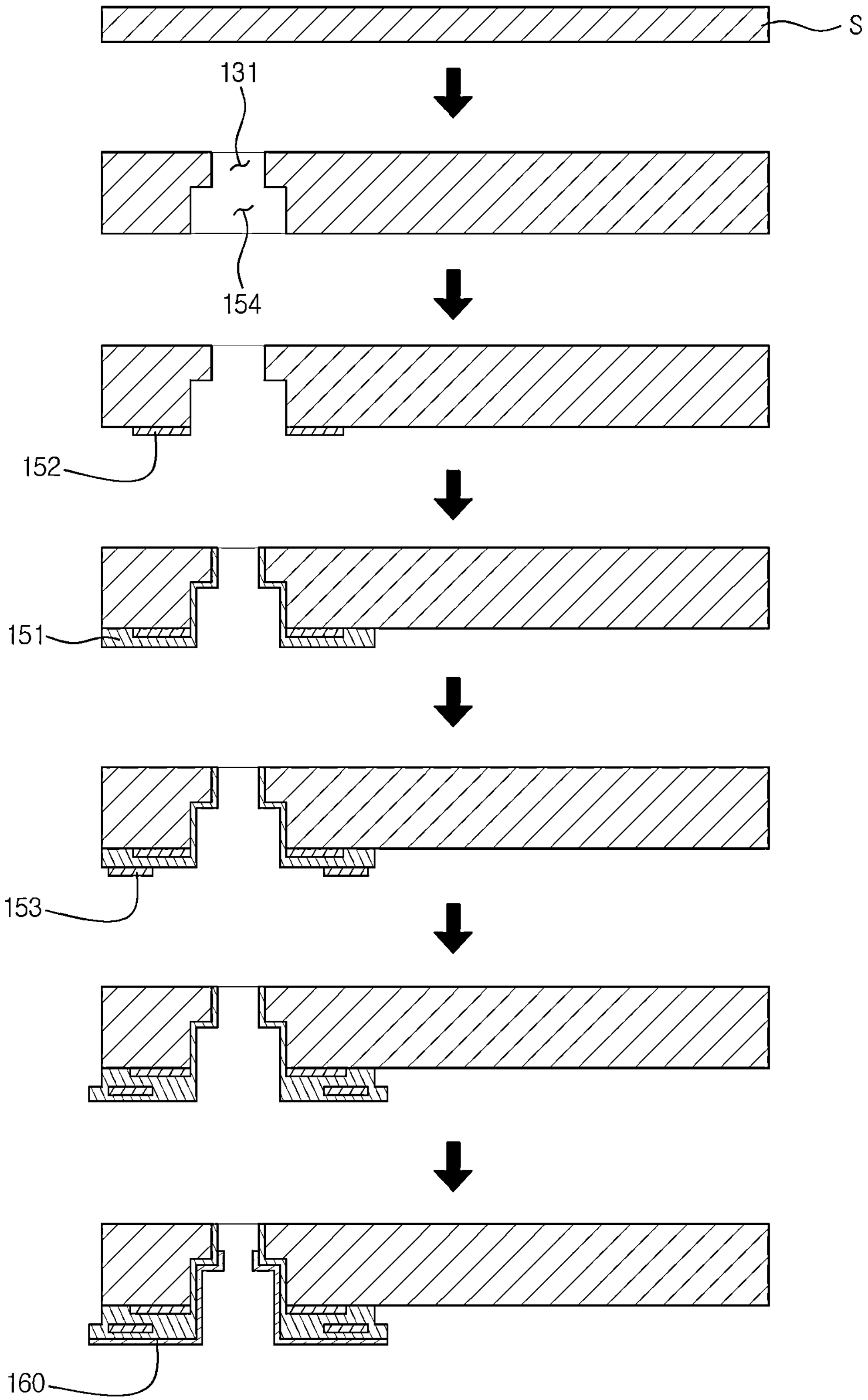
FIG. 15 is a view showing a method of manufacturing a nozzle layer.

The step of manufacturing the nozzle layer 130 is illustrated in FIG. 15.

The method of manufacturing the nozzle layer 130 is similar to the method of manufacturing the chamber layer 110. The nozzle layer 130 may be manufactured with a Si wafer S. For more precis manufacturing, an SOI wafer S may be used. A glass wafer may also be used. The nozzle layer 130 may be manufactured to have a thickness of 200 μm to 400 μm. On the top of the wafer S, the photo process and the etching process are used to form a channel for the nozzle 131. Then, the outlet 154 is formed by applying the photo process and the etching process to the bottom of the wafer S. The size of nozzle 131 may be varied depending on the size of droplets to be discharged. To discharge droplets of several picoliters or less, i.e., ultrafine droplets. The nozzle 131 may have a diameter of 10 μm or less. To discharge large droplets, the nozzle 131 may have a diameter of 50 μm or more. The bottom of the nozzle layer 130 may be protected with the insulating layer 151. For example, $SiO_2$ may be deposited on the bottom of the nozzle layer 130. In this case, the insulating layer 151 may be formed encompassing the inside of the outlet 154 and the inside of the nozzle 131.

The third electrode 152 for forming the induced electrostatic force may be formed beneath the nozzle layer 130. In this case, the third electrode 152 is surrounded with the insulating layer 151 so as not to be in contact with ink. As described above, the third electrodes 152 in this case may be integrally formed for the plurality of nozzles 131 or may be individually separated for the nozzles 131.

When the second voltage controller 155 applies voltage to the third electrode 152, charges are induced in the ink inside the nozzle 131 and thus droplets are discharged through the opening of the nozzle 131 by the electric field around the nozzle 131. In this case, DC voltage, DC pulse voltage, or AC voltage may be applied to the third electrode 152. The droplets may be discharged by a process that charges induced in the ink are continuously dissipated and induced again, and this process may be electrically construed as the flow of the induced current.

When the piezoelectric body 142 is operated by the continuous DC voltage and the pulse applied to the piezoelectric body 142 to discharge droplets, the droplets hit the printing medium while dissipating the induced charges, and it is therefore possible to discharge the droplets. In this case, the DC voltage may be lower than or equal to an onset voltage of when the droplet is discharged by only the electrostatic force.

Even when the droplets are continuously discharged by applying the DC pulse to the third electrode 152 and operating the piezoelectric body 142, the generation of induced charges based on the generation and discharge of the droplets may be continued.

In terms of the induced charges, the most preferable voltage is the AC voltage. When positive and negative charges are alternately generated, it is easier to continuously generate the induced charges. However, even when the DC voltage is applied, continuous ink operation is possible as described above without any problems because the induced charges are dissipated and new charges are induced in the ink as the droplets are discharged.

The third electrode 152 is formed to surround the nozzle 131 by depositing the electrode layer on the insulating layer 151 formed beneath the nozzle layer 130, and then applying the photo process and the etching process to the deposited electrode layer. In this case, the third electrode 152 may have various shapes such as a circular shape, a horseshoe shape, a quadrangular shape, a diamond shape, etc. as long as it can surround all or some of the nozzles 131. When it is assumed that the third electrode 152 has the circular shape, the inner diameter of the third electrode 152 may be larger than or equal to the outer diameter of the nozzle 131. By depositing the insulating layer 151 on the processed third electrode 152, the third electrode 152 may be disposed to be surrounded with the insulating layer 151. $SiO_2$, $SiN_x$, etc. may be deposited as the insulating layer, and polyimide or the like polymer layer may be deposited.

When the nozzle layer 130 is made of an insulating material, i.e., the glass wafer, the third electrode 152 may be directly formed beneath the nozzle layer 130 without the insulating layer, and the insulating layer 151 may be formed beneath the third electrode 152, as shown in FIG. 15. In this case, the insulating layer 151 may be formed even inside the outlet 154 and the nozzle 131.

Further, the fourth electrode 153 may be additionally formed below the third electrode 152 surrounded with the insulating layer 151, and the insulating layer 151 may be applied below the fourth electrode 153.

Next, to have a water repellent effect, the hydrophobic coating layer 160 made of hydrophobic material based on a fluoropolymer may be formed beneath the insulating layer 151. The water repellent layer may be formed by a spray coating method, an e-beam evaporator, a sputter or the like vacuum deposition.

The hydrophobic coating layer 160 may be formed inward up to a predetermined depth from the end of the nozzle 131. When the hydrophobic coating layer 160 is formed, the hydrophobic coating layer 160 is coated while air is sprayed through the nozzle 131. In this case, the depth, up to which the hydrophobic coating layer 160 is coated on the inside of the nozzle 131, may be controlled according to the speeds of sprayed air.

As described above, the chamber layer 110, the channel layer 120, the nozzle layer 130 are individually manufactured, and then the chamber layer 110, the channel layer 120, and the nozzle layer 130 are jointed together. First, the chamber layer 110 and the channel layer 120 are joined by anodic bonding, and then the nozzle layer 130 is joined beneath the channel layer 120 by anodic bonding.

When both the two layers to be joined are manufactured with the silicon wafer, they may be joined by direct bonding. Further, when the channel layer 120 is manufactured with the glass wafer, the anodic bonding may be used. When the channel layer 120 is manufactured with the Si wafer, Si direct bonding may be used.

Next, the lower electrode (i.e., the first electrode 141) of the piezoelectric actuator 140 is formed on the completed device. The piezoelectric body 142 is formed on the first electrode 141, and the second electrode 143 is deposited on the piezoelectric body 142, thereby completing the piezoelectric actuator 140. The piezoelectric body 142 may be fixed as a bulk piezoelectric body 142 onto the membrane 115 of the chamber layer 110 by bonding. Alternatively, the sputter may be used to deposit the piezoelectric body 142, and then the photo and etching processes may be performed. Alternatively, screen printing or the like printing method may be used to apply a material of the piezoelectric body 142, thereby forming the layer of the piezoelectric body 142.

In the foregoing inkjet printhead according to the disclosure and the method of manufacturing the same, electrostatic force induced in a meniscus, which is formed at the end of the nozzle by the pressure wave based on the operation of the piezoelectric body, is used to generate droplets, and it is thus possible to generate stronger discharging force than that of the inkjet printhead based on the operation of the piezoelectric body, thereby having advantages in that ink having a viscosity of 30 cP higher than 10 cP, which is the viscosity the ink dischargeable by the conventional inkjet printhead has, is dischargeable and even ink having a viscosity of 100 cP or higher is also dischargeable Further, discharging power is so strong that droplets can be discharged even when the diameter of the nozzle is smaller than that of the conventional inkjet printhead, thereby having advantages in that ink droplets can be discharged at a femtoliter level (for reference, it is difficult for a conventional inkjet printhead to stably discharge droplets of not more than 1 picoliter (i.e., a diameter of 12.4 μm)).

Further, the nozzles of the multi-nozzle are controlled to be different in the level of the high voltage applied to the electrode for electrohydrodynamic jetting while an electric signal for driving the piezoelectric body is maintained constant, thereby having advantages in that the droplets discharged through the nozzles can be uniform in size.

Further, the fourth electrode is additionally disposed beneath the third electrode, thereby having advantageous in the discharging force and direction are more precisely controlled.

Further, the fifth electrode is additionally disposed between the channel layer and the chamber layer, thereby having advantageous in that the induced electrostatic force of the third electrode is reinforced or the oscillation of the membrane is strengthened by the electrostatic force acting between the first electrode and the fifth electrode.

Although detailed embodiments of a fluidic lens with a variable focal length according to the disclosure have been described, the disclosure is not limited to such detailed embodiments. Various changes and modifications can be made by a person having ordinary knowledge in the art without departing from the spirit and scope of the invention defined in the appended claims.

What is claimed is:

1. A inkjet printhead, comprising:

a first layer comprising an inlet formed to penetrate a substrate and introduce ink therein, and a plurality of membranes;

a second layer disposed beneath the first layer, and comprising a manifold formed to penetrate a substrate or to be recessed on a top of the substrate to communicate with the inlet, and a plurality of nozzle channels formed to penetrate the substrate below the membrane and allow the ink transferred from the manifold to flow therein;

a third layer disposed beneath the second layer, and comprising a plurality of nozzles formed in a substrate and communicating the plurality of nozzle channels;

a piezoelectric actuator formed on the first layer formed with the membrane, and comprising a lower first electrode, a piezoelectric body on the first electrode, and a second electrode on the piezoelectric body;

a first voltage controller configured to oscillate the membrane by applying a pulse voltage to the first electrode and the second electrode;

a third electrode disposed beneath the third layer, formed around each nozzle, and surrounded with an insulator;

a second voltage controller configured to discharge droplets of the ink based on induced electric force by applying voltage to the third electrode;

a fifth electrode disposed between the first layer and the second layer and surrounded with an insulating layer; and a fourth voltage controller configured to apply voltage to the fifth electrode.

2. The inkjet printhead of claim 1, wherein the first layer comprises a plurality of chambers recessed inward from a bottom thereof to store the ink and formed with the membrane above a top thereof.

3. The inkjet printhead of claim 2, wherein the chamber communicates with the manifold at a first side and communicates with the nozzle channel at a second side.

4. The inkjet printhead of claim 1, further comprising a hydrophobic coating layer disposed beneath an insulating layer formed the insulator and coated with a hydrophobic material.

5. The inkjet printhead of claim 4, wherein the hydrophobic coating layer is coated from an end of the nozzle to an inside of the nozzle.

6. The inkjet printhead of claim 1, wherein voltage applied by the first voltage controller is synchronized with voltage applied by the second voltage controller.

7. The inkjet printhead of claim 6, wherein the second voltage controller applies voltage to the third electrode to discharge a droplet when a meniscus is formed at an end of the nozzle as the first voltage controller applies a pulse voltage between the first electrode and the second electrode to make the piezoelectric actuator oscillate the membrane, and the second voltage controller applies a voltage having an opposite polarity to a discharging voltage to the third electrode or applies a voltage of OV to the third electrode after the discharged droplet passes the third electrode.

8. The inkjet printhead of claim 1, further comprising:

a fourth electrode disposed beneath the third electrode, surrounded with an insulating layer, and disposed encompassing an outlet having a larger diameter than an opening of the nozzle; and a third voltage controller configured to apply voltage to the fourth electrode.

9. The inkjet printhead of claim 8, wherein voltage applied by the second voltage controller is synchronized with voltage applied by the third voltage controller.

10. The inkjet printhead of claim 8, wherein a horizontal distance between the fourth electrode and the nozzle is longer than a horizontal distance between the third electrode and the nozzle.

11. The inkjet printhead of claim 8, wherein the plurality of nozzles are arranged in a matrix, and the third electrodes arranged in one of a row direction and a column direction are electrically connected to simultaneously receive voltage from the second voltage controller, and the fourth electrodes arranged in the other one of the row direction and the column direction are electrically connected to simultaneously receive voltage from the third voltage controller.

12. The inkjet printhead of claim 1, wherein the first voltage controller applies the same pulse voltage to the piezoelectric actuators respectively corresponding to the membranes, and the second voltage controller applies different voltages to the third electrodes according to the nozzles to make droplets discharged from the nozzles be uniform in size.

13. The inkjet printhead of claim 1, wherein the fourth voltage controller applies voltage, which has an opposite polarity to the voltage of the second voltage controller, to the fifth electrode, or serves as the ground.

14. The inkjet printhead of claim 1, wherein the pulse voltage applied by the first voltage controller is synchronized with the pulse voltage applied by the fourth voltage controller, so that electrostatic force based on potential difference between the first electrode and the fifth electrode can reinforce the oscillation of the membrane.

15. The inkjet printhead of claim 1, wherein the third electrodes are integrally formed for the plurality of nozzles.

16. A method of manufacturing an inkjet printhead, comprising:

manufacturing a first layer comprising an inlet formed to penetrate a substrate and introduce ink therein, and a plurality of membranes on which a first electrode of a piezoelectric actuator is formed, a second layer comprising a manifold formed to penetrate a substrate or to be recessed on a top of the substrate to communicate with the inlet, and a plurality of nozzle channels formed to penetrate the substrate below the membrane and allow the ink transferred from the manifold to flow therein, and a third layer comprising a plurality of nozzles formed in a substrate and communicating the plurality of nozzle channels, and a third electrode disposed beneath the third layer, formed around each nozzle, and surrounded with an insulator;

joining the first layer, the second layer, and the third layer in sequence;

forming a piezoelectric body and a second electrode for a piezoelectric actuator on the first electrode; and forming a fifth electrode disposed on the second layer and surrounded with an insulator when the third layer is manufactured.

17. The method of claim 16 the first layer comprises a plurality of chambers recessed inward from a bottom thereof to store the ink and formed with the membrane above a top thereof.

18. The method of claim 16, further comprising coating a hydrophobic material on a lower layer of the insulator when the third layer is manufactured.

19. The method of claim 18, wherein a hydrophobic coating layer coated with the hydrophobic material is coated from an end of the nozzle to an inside of the nozzle.

20. The method of claim 16, further comprising forming a fourth electrode, disposed beneath the third electrode, surrounded with an insulator, and having a larger diameter than the third electrode when the third layer is manufactured.

* * * * *